US012804601B2

(12) United States Patent
Xu et al.

(10) Patent No.: US 12,804,601 B2
(45) Date of Patent: Nov. 17, 2026

(54) SERVICE PAGING METHOD, RELATED DEVICE, AND SYSTEM

(71) Applicant: HUAWEI TECHNOLOGIES CO., LTD., Shenzhen (CN)

(72) Inventors: Bin Xu, Beijing (CN); Bingzhao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 321 days.

(21) Appl. No.: 18/516,987

(22) Filed: Nov. 22, 2023

(65) Prior Publication Data

US 2024/0089922 A1 Mar. 14, 2024

Related U.S. Application Data

(63) Continuation of application No. PCT/CN2022/097179, filed on Jun. 6, 2022.

(30) Foreign Application Priority Data

Jun. 16, 2021 (CN) ......................... 202110670508.2

(51) Int. Cl.
*H04W 68/02* (2009.01)
*H04W 4/06* (2009.01)

(52) U.S. Cl.
CPC ............. *H04W 68/02* (2013.01); *H04W 4/06* (2013.01)

(58) Field of Classification Search
CPC ....... H04W 68/02; H04W 4/06; H04W 76/27; H04W 68/005; H04W 12/69; H04W 12/76; H04W 76/30; H04W 76/40; H04W 68/00
See application file for complete search history.

(56) References Cited

U.S. PATENT DOCUMENTS

2022/0369411 A1* 11/2022 Agiwal ................. H04L 5/0053
2023/0070801 A1* 3/2023 Liu ....................... H04W 68/02
2023/0328688 A1* 10/2023 Kumar .................. H04W 60/00 455/458
2024/0080940 A1* 3/2024 Fujishiro ............. H04W 68/025
2024/0172175 A1* 5/2024 Li ......................... H04L 12/189
2024/0236944 A1* 7/2024 Jiang ..................... H04W 76/30

FOREIGN PATENT DOCUMENTS

WO 2022005259 A1 1/2022

* cited by examiner

*Primary Examiner* — Kenneth T Lam

(57) ABSTRACT

Embodiments of this application disclose a service paging method, a related device, and a system. The method may include: When a core network device and an access network device perform multicast and broadcast service paging on a terminal device, update and/or security processing are/is performed on an identifier used to identify a multicast and broadcast service each time. The terminal device can determine the multicast and broadcast service based on the identifier on which update and/or security processing are/is performed. In embodiments of this application, the identifier on which update and/or security processing are/is performed is used during multicast and broadcast service paging. In this way, difficulty of tracking the multicast and broadcast service by an eavesdropper can be increased, to improve security of the multicast and broadcast service.

18 Claims, 12 Drawing Sheets

SERVICE PAGING METHOD, RELATED DEVICE, AND SYSTEM

CROSS-REFERENCE TO RELATED APPLICATIONS

This application is a continuation of International Application No. PCT/CN2022/097179, filed on Jun. 6, 2022, which claims priority to Chinese Patent Application No. 202110670508.2, filed on Jun. 16, 2021. The disclosures of the aforementioned applications are hereby incorporated by reference in their entireties.

TECHNICAL FIELD

This application relates to the field of communication technologies, and in particular, to a service paging method, a related device, and a system.

BACKGROUND

With development of the mobile Internet, terminal electronic devices are widely used, and a large quantity of multicast and broadcast services (Multicast and Broadcast Service, MBS) emerge, for example, a live streaming service, a public safety service, and a batch software update service. The MBS service is ubiquitous in people's daily work and life, and connects all aspects of daily work and life. Particularly, the public safety service is closely related to people's personal and property safety.

However, in the conventional technology, in an actual transmission process of the MBS service, there is a security risk problem such as eavesdropping or tracking of a service identifier of the MBS service. Consequently, normal implementation of the MBS service is severely affected. Particularly, security of the public safety service such as fire communication is more important. Therefore, how to provide a solution for improving security of the MBS service is an urgent problem to be resolved.

SUMMARY

Embodiments of this application provide a service paging method, a related device, and a system, to improve security of a Multicast and Broadcast Service (MBS) service.

According to a first aspect, an embodiment of this application provides a service paging method. The method is applied to an access network device, and may include:

The access network device sends a first message to a terminal device, where the first message includes a first paging identifier, the first message is used to perform first paging on the terminal device, and the first paging identifier is used to identify a first service; and the access network device sends a second message to the terminal device, where the second message includes a second paging identifier, the second paging identifier is used to replace, during second paging, the first paging identifier to identify the first service, and the second paging is next paging of the first paging.

In this embodiment of this application, the access network device first performs the first paging on the terminal device by using the first message, and identifies the first service by using the first paging identifier in a first paging process; and then the access network device uses the second message to carry the second paging identifier used to identify the first service in a next paging (namely, second paging) process. To be specific, when the access network device performs the next paging of the first paging on the terminal device, the first service is no longer identified by the first paging identifier, but is replaced with the second paging identifier carried in the second message. In this way, an identifier of the first service may be changed to increase difficulty of tracking the first service by an eavesdropper. In conclusion, the access network device continuously updates the identifier of the first service in a process of sending a plurality of messages to the terminal device, so that different identifiers are used for a plurality of times of paging initiated by the access network device to the terminal device for the first service. Therefore, in a plurality of paging processes, a case in which the first service is easily tracked by the eavesdropper is avoided because the identifier of the first service is changed, and service security is improved.

In a possible implementation, the second message is a Radio Resource Control (RRC) message or a Non-Access Stratum (NAS) message.

In this embodiment of this application, the second message may be an RRC message, or may be a NAS message. Before the second paging is initiated, the access network device may deliver the second paging identifier used to identify the first service during the second paging to the terminal device in advance by sending the RRC message or forwarding the NAS message. Therefore, when receiving the second paging, the terminal device can determine, by using the second paging identifier, that a service that the second paging is specific to is the first service. In this embodiment of this application, before the second paging is initiated, an updated identifier is delivered in advance, so that the terminal device can determine the first service when the second paging is initiated. In this way, it can be ensured that normal paging is performed by using the updated identifier, and further it can be ensured that service security is improved.

In a possible implementation, the method further includes: The access network device receives a third message sent by a core network device, where the third message includes a third paging identifier, the third paging identifier is used to identify the first service, the third message is a session indication message, and the session indication message indicates the access network device to suspend, stop, activate, or release a session of the first service.

In this embodiment of this application, the access network device receives the session indication message sent by the core network device. A function of the session indication message is to indicate the access network device to suspend, stop, activate, or release the session of the first service, and deliver the third paging identifier to the access network device in advance. When receiving a message used by the core network device to indicate the access network device to initiate the second paging, the access network device may determine, based on the third paging identifier, that the service that the second paging is specific to is the first service. Then, the access network device may set the second paging identifier based on the third paging identifier in a core network paging message, to prepare for delivering the second paging identifier to the terminal device in advance. In this embodiment of this application, before the second paging is initiated, the access network device can determine the third paging identifier and the second paging identifier. In this way, it can be ensured that normal paging is performed by using the updated identifier, and further it can be ensured that service security is improved.

In a possible implementation, the third message is a core network paging message, and the core network paging message indicates the access network device to perform the second paging on the terminal device.

In this embodiment of this application, the access network device receives the core network paging message sent by the core network device. A function of the core network paging message is to indicate the access network device to perform the second paging on the terminal device. The access network device may determine, by using the third paging identifier, that the second paging initiated by the access network device based on an indication of the core network device is specific to the first service. However, in a core network paging message that indicates the access network to initiate the first paging, the first service is identified by using a fourth paging identifier. In this embodiment of this application, the second paging process for the first service is indicated by the core network device, and the third paging identifier replaces the fourth paging identifier carried in the core network paging message in the first paging process. When initiation of the second paging is indicated, the updated identifier is used to improve service security.

In a possible implementation, the third paging identifier is an MBS session identifier, a temporary mobile group identity (Temporary mobile group identification, TMGI), or an Internet Protocol (IP) multicast address.

In this embodiment of this application, in a paging scenario for a multicast and broadcast service, a used identifier is an MBS session identifier, a TMGI, or an IP multicast address. In this embodiment of this application, the identifier of the multicast and broadcast service is updated, so that different identifiers are used for a plurality of times of paging for the same multicast and broadcast service. Therefore, in a plurality of paging processes, it is difficult for the eavesdropper to track the multicast and broadcast service because the identifier used to identify the multicast and broadcast service is changed. In this way, difficulty of tracking the service by the eavesdropper is increased, to improve security of the multicast and broadcast service.

In a possible implementation, the method further includes: The access network device sends a fourth message to the terminal device, where the fourth message includes the second paging identifier, and the fourth message is used to perform the second paging on the terminal device.

In this embodiment of this application, when receiving the core network paging message sent by the core network device, the access network device obtains an indication for initiating the second paging, and determines, based on the third paging identifier, that the service that the second paging is specific to is the first service. Then, the access network device sends the fourth message to the terminal device. The fourth message is a group paging message, and is used to initiate the second paging to the terminal device. The second paging identifier indicates that the service that the second paging is specific to is the first service. In this embodiment of this application, the identifier of the first service is updated, and the second paging identifier is used to replace the first paging identifier to perform the second paging, so that different identifiers are used for a plurality of times of paging for the first service. Therefore, in a plurality of paging processes, it is difficult for the eavesdropper to track the first service because the identifier used to identify the first service is changed. In this way, difficulty of tracking the service by the eavesdropper is increased, to improve security of the multicast and broadcast service.

In a possible implementation, the third paging identifier is an identifier for which a mapping relationship with an MBS session identifier, a temporary mobile group identity (TMGI), or an IP multicast address is established.

In this embodiment of this application, in a paging scenario for a multicast and broadcast service, an identifier for which a mapping relationship with an MBS session identifier, a TMGI, or an IP multicast address is established is used. In this embodiment of this application, mapping processing is performed on the identifier, to implement anonymization, and then update and/or security processing are/is performed on an identifier existing after mapping. In this way, difficulty of tracking the service by the eavesdropper is further increased, to further improve security of the multicast and broadcast service.

In a possible implementation, the method further includes: When the terminal device does not receive group paging for the first service, the access network device receives a core network paging message or a unicast paging message sent by the core network device, where the core network paging message or the unicast paging message indicates the access network device to re-initiate paging for the first service to the terminal device; and the access network device sends a group paging message or a unicast paging message to the terminal device, where the group paging message or the unicast paging message is used to re-initiate paging for the first service to the terminal device.

In this embodiment of this application, when the terminal device does not receive the current group paging or encounters a receiving error, the access network device sends the group paging message to all terminal devices, to re-initiate paging to the terminal device; or the access network device separately sends the unicast paging message to terminal devices that do not receive the current group paging or encounter a receiving error, to re-initiate paging to these terminal devices. Therefore, it can be ensured that all terminal devices interested in the MBS service can normally enter a connected mode to receive service data. In addition, in a scenario in which the updated identifier is used, a case in which because access is missed, the terminal device cannot learn, in advance, of an updated identifier to be used for next paging can be avoided. This can ensure that the updated identifier can be normally used. Therefore, quality of service of the first service can be improved, and security of the first service can be ensured.

According to a second aspect, an embodiment of this application provides a service paging method. The method is applied to an access network device, and may include:

The access network device receives a core network paging message sent by a core network device, where the core network paging message includes a first paging identifier and a second paging identifier, the first paging identifier is used to identify a first service during first paging, the second paging identifier is used to identify the first service during second paging, the core network paging message indicates the access network device to initiate the first paging to a terminal device for the first service, and the second paging is next paging of the first paging; the access network device sends a first message, where the first message includes the first paging identifier, and the first message may be a first group paging message, and is used to perform the first paging on the terminal device for the MBS service; and the access network device sends a second message, where the second message includes the second paging identifier.

In this embodiment of this application, the core network paging message carries the first paging identifier and the second paging identifier that are to be used for the first paging and the second paging. When receiving an indication for initiating the first paging by using the core network paging message, the access network device may learn in advance that an identifier to be used to indicate to initiate the second paging for the first service is the second paging identifier. Therefore, before the second paging is initiated, the access network device may deliver the second paging identifier to the terminal device in advance by using an RRC message. Therefore, when the access network device initiates the second paging to the terminal device by replacing the first paging identifier with the second paging identifier, the terminal device may determine the first service based on the second paging identifier. In this embodiment of this application, different identifiers are used for a plurality of times of paging initiated by the access network device to the terminal device for the first service. Therefore, in a plurality of paging processes, a case in which the first service is easily tracked by an eavesdropper is avoided because an identifier of the first service is changed, and service security is improved.

In a possible implementation, the method further includes: When the terminal device does not receive group paging for the first service, the access network device receives a core network paging message or a unicast paging message sent by the core network device, where the core network paging message or the unicast paging message indicates the access network device to re-initiate paging for the first service to the terminal device; and the access network device sends a group paging message or a unicast paging message to the terminal device, where the group paging message or the unicast paging message is used to re-initiate paging for the first service to the terminal device.

According to a third aspect, an embodiment of this application provides a service paging method. The method is applied to an access network device, and may include:

The access network device receives a NAS message or a session indication message sent by a core network device, where the NAS message or the session indication message includes one or more of a paging identifier update rule, an initial paging identifier, and a parameter required for updating a paging identifier; the access network device forwards the NAS message or sends an RRC release message to a terminal device, where the RRC release message is a message corresponding to the session indication message, and carries one or more of the paging identifier update rule, the initial paging identifier, and the parameter required for updating a paging identifier, and the parameter required for updating a paging identifier may be a quantity of updates to be made based on the initial paging identifier or a first paging identifier according to the paging identifier update rule; and the access network device sends a fourth message to the terminal device, where the fourth message includes a second paging identifier, the second paging identifier is used to identify a first service, and the fourth message is used to initiate second paging to the terminal device for the service.

In this embodiment of this application, one or more of the paging identifier update rule, the initial paging identifier, and the parameter required for updating a paging identifier may be delivered by the core network device by using the NAS message when the terminal device joins a service group of the first service, may be delivered by the access network device by using the RRC message, or may be specified in a protocol. In this way, when learning, by using the NAS message or the session indication message, of the parameter required for updating a paging identifier, the access network device and the terminal device may update the initial paging identifier (or the first paging identifier) for a specific quantity of times according to the paging identifier update rule, to learn, in advance, of an identifier to be used for next paging for the first service. Therefore, it can be ensured, by adjusting and updating a parameter, that different identifiers are used for a plurality of times of paging initiated by the access network device to the terminal device for the first service. Therefore, in a plurality of paging processes, a case in which the first service is easily tracked by an eavesdropper is avoided because an identifier of the first service is changed, and security of the first service is improved.

In a possible implementation, the method further includes: When the terminal device does not receive group paging for the first service, the access network device receives a core network paging message or a unicast paging message sent by the core network device, where the core network paging message or the unicast paging message indicates the access network device to re-initiate paging for the first service to the terminal device; and the access network device sends a group paging message or a unicast paging message to the terminal device, where the group paging message or the unicast paging message is used to re-initiate paging for the first service to the terminal device.

According to a fourth aspect, an embodiment of this application provides a service paging method. The method is applied to an access network device, and may include:

The access network device receives a core network paging message sent by a core network device, where the core network paging message includes a fourth paging identifier, the core network paging message indicates the access network device to initiate paging to a terminal device for a first service, and the fourth paging identifier may be an MBS session identifier, a TMGI, or an IP multicast address, may be an identifier for which a mapping relationship with an MBS session identifier, a TMGI, or an IP multicast address is established, or may be obtained by performing security processing on any one of an MBS session identifier, a TMGI, an IP multicast address, or an identifier for which a mapping relationship with an MBS session identifier, a temporary mobile group identity TMGI, or an IP multicast address is established; the access network device sets a first paging identifier based on the fourth paging identifier, where security processing is also performed on the first paging identifier; and the access network device sends a group paging message, where the group paging message includes the first paging identifier, the group paging message is used to initiate paging to the terminal device, and the first paging identifier is used to identify the first service.

In this embodiment of this application, before paging is initiated, all of the core network device, the access network device, and the terminal device learn, in advance, of security information to be used for security processing. The security information includes one or more of a key, a security input parameter, and a security algorithm. The security information may be delivered by the core network device by using a NAS message when the terminal device joins a service group of the first service, may be delivered by the access network device by using an RRC message, or may be specified in a protocol. In this way, when receiving an identifier on which security processing (for example, encryption) is performed, the access network device and the terminal device may correspondingly decrypt the identifier based on the security information, to determine that the identifier is specific to the first service. However, due to a lack of the security information, it is difficult for an eavesdropper to obtain content existing after security processing. Therefore, difficulty of tracking the service by the eavesdropper can be increased, to improve security of the first service.

In a possible implementation, the method further includes: When the terminal device does not receive group paging for the first service, the access network device receives a core network paging message or a unicast paging message sent by the core network device, where the core network paging message or the unicast paging message indicates the access network device to re-initiate paging for the first service to the terminal device; and the access network device sends a group paging message or a unicast paging message to the terminal device, where the group paging message or the unicast paging message is used to re-initiate paging for the first service to the terminal device.

According to a fifth aspect, an embodiment of this application provides a service paging method. The method is applied to a terminal device, and may include:

The terminal device receives a first message sent by an access network device, where the first message includes a first paging identifier, the first message is used to perform first paging on the target terminal device, and the first paging identifier is used to identify a first service; and the terminal device receives a second message sent by the access network device, where the second message includes a second paging identifier, the second paging identifier is used to replace, during second paging, the first paging identifier to identify the first service, and the second paging is next paging of the first paging.

In this embodiment of this application, the terminal device first determines the first service by using the first paging identifier, and accesses the first paging in response to the first message; and then the terminal device receives the second message. The second message includes the second paging identifier. When the access network device performs the next paging (namely, the second paging) of the first paging on the terminal device, the first service is identified by the second paging identifier instead of the first paging identifier. Before the second paging is initiated, the terminal device learns in advance that an identifier to be used for the second paging is the second paging identifier. Therefore, the terminal device can monitor the second paging for the first service by using the second paging identifier. In this way, an identifier of the first service may be changed to increase difficulty of tracking the first service by an eavesdropper. In conclusion, in a process of receiving a plurality of messages sent by the access network device, the terminal device determines to continuously update the identifier of the first service, so that different identifiers used by the access network device for a plurality of times of paging for the first service can be normally used. Therefore, in a plurality of paging processes, a case in which the first service is easily tracked by the eavesdropper is avoided because the identifier of the first service is changed, and service security is improved.

In a possible implementation, the second message is an RRC message or a NAS message.

In this embodiment of this application, the second message may be an RRC message, or may be a NAS message. Before receiving the second paging, the terminal device learns, in advance by receiving the RRC message or the NAS message, of the second paging identifier used to identify the first service during the second paging. Therefore, when receiving the second paging, the terminal device can determine, by using the second paging identifier, that a service that the second paging is specific to is the first service. In this way, it can be ensured that normal paging is performed by using an updated identifier, and further it can be ensured that service security is improved.

In a possible implementation, the method further includes: The terminal device receives a fourth message sent by the access network device, where the fourth message includes the second paging identifier, and the fourth message is used to perform the second paging on the terminal device.

In this embodiment of this application, the terminal device receives the fourth message sent by the access network device. The fourth message is a group paging message, and is used to perform the second paging on the terminal device. The second paging identifier indicates that the service that the second paging is specific to is the first service. In this embodiment of this application, the identifier of the multicast and broadcast service is updated, and the second paging identifier is used to replace the first paging identifier to perform the second paging, so that different identifiers are used for a plurality of times of paging for the first service. Therefore, in a plurality of paging processes, it is difficult for the eavesdropper to track the first service because the identifier used to identify the first service is changed. In this way, difficulty of tracking the service by the eavesdropper is increased, to improve security of the multicast and broadcast service.

In a possible implementation, the method further includes: When the terminal device joins a service group of the first service, the terminal device receives a NAS message sent by a core network device, where the NAS message includes the first paging identifier.

In this embodiment of this application, when the terminal device joins the service group of the first service, the terminal device learns of the first paging identifier that identifies the first service during the first paging from the NAS message sent by the core network device. Therefore, a prerequisite can be provided for normal implementation of paging performed for the first service by using the updated identifier.

In a possible implementation, the first paging identifier and the second paging identifier that are received by the terminal device each are an MBS session identifier, a TMGI, or an IP multicast address, or the first paging identifier and the second paging identifier each are an identifier for which a mapping relationship with an MBS session identifier, a TMGI, or an IP multicast address is established.

In this embodiment of this application, in a paging scenario for a multicast and broadcast service, a used identifier is an MBS session identifier, a TMGI, or an IP multicast address, or a used identifier is an identifier for which a mapping relationship with an MBS session identifier, a TMGI, or an IP multicast address is established. In this way, difficulty of tracking the service by the eavesdropper is increased, to improve security of the multicast and broadcast service. If update and/or security processing are/is further performed on the identifier on which mapping processing is performed, difficulty of tracking the service by the eavesdropper can be further increased, to further improve security of the multicast and broadcast service.

In a possible implementation, the method further includes: When the terminal device does not receive group paging for the first service, the terminal device receives a group paging message or a unicast paging message sent by the access network device, where the group paging message or the unicast paging message is used to re-initiate paging for the first service to the terminal device.

In this embodiment of this application, when the terminal device does not receive the current group paging or encounters a receiving error, the terminal device receives the group paging message sent by the access network device, where the group paging message is used to re-initiate paging for the first service to the terminal device; or the terminal device receives the unicast paging message sent by the access network device, where the unicast paging message is used to re-initiate paging to the terminal device that does not receive the current group paging or encounters a receiving error.

Therefore, it can be ensured that all terminal devices interested in the MBS service can normally enter a connected mode to receive service data. In addition, in a scenario in which the updated identifier is used, a case in which because access is missed, the terminal device cannot learn, in advance, of an updated identifier to be used for next paging can be avoided. This can ensure that the updated identifier can be normally used. Therefore, quality of service of the first service can be improved, and security of the first service can be ensured.

According to a sixth aspect, an embodiment of this application provides a service paging method. The method is applied to a terminal device, and may include:

The terminal device receives a NAS message sent by a core network device or an RRC message sent by an access network device, where the NAS message or the RRC message includes one or more of a paging identifier update rule, an initial paging identifier, and a parameter required for updating a paging identifier, and the parameter required for updating a paging identifier may be a quantity of updates to be made based on the initial paging identifier or a first paging identifier according to the paging identifier update rule; and the terminal device receives a fourth message sent by the access network device, where the fourth message includes a second paging identifier, the second paging identifier is used to identify a first service, and the fourth message is used to initiate second paging to the terminal device for the service.

In this embodiment of this application, one or more of the paging identifier update rule, the initial paging identifier, and the parameter required for updating a paging identifier may be delivered by the core network device by using the NAS message when the terminal device joins a service group of the first service, may be delivered by the access network device by using the RRC message, or may be specified in a protocol. In this way, when learning, by using the NAS message or the RRC message, of the parameter required for updating a paging identifier, the terminal device may update the initial paging identifier (or the first paging identifier) for a specific quantity of times according to the paging identifier update rule, to learn, in advance, of an identifier to be used for next paging for the first service. Therefore, it can be ensured, by adjusting and updating a parameter, that different identifiers are used for a plurality of times of paging initiated by the access network device for the first service. Therefore, in a plurality of paging processes, a case in which the first service is easily tracked by an eavesdropper is avoided because an identifier that identifies the first service is changed, and security of the first service is improved.

In a possible implementation, the method further includes: When the terminal device does not receive group paging for the first service, the terminal device receives a group paging message or a unicast paging message sent by the access network device, where the group paging message or the unicast paging message is used to re-initiate paging for the first service to the terminal device.

According to a seventh aspect, an embodiment of this application provides a service paging method. The method is applied to a terminal device, and may include:

The terminal device receives a group paging message sent by an access network device, where the group paging message includes a first paging identifier, the group paging message is used to initiate paging for a first service to the terminal device, the first paging identifier may be obtained by performing security processing on an MBS session identifier, a TMGI, or an IP multicast address, and the first paging identifier is used to identify the first service.

In this embodiment of this application, before paging is initiated, all of a core network device, the access network device, and the terminal device learn, in advance, of security information to be used for security processing. The security information includes one or more of a key, a security input parameter, and a security algorithm. The security information may be delivered by the core network device by using a NAS message when the terminal device joins a service group of the first service, may be delivered by the access network device by using an RRC message, or may be specified in a protocol. In this way, when receiving an identifier on which security processing (for example, encryption) is performed, the terminal device may correspondingly decrypt the identifier based on the security information, to determine that the identifier is specific to the first service. However, due to a lack of the security information, it is difficult for an eavesdropper to obtain content existing after security processing. Therefore, difficulty of tracking the service by the eavesdropper can be increased, to improve security of the first service.

In a possible implementation, the method further includes: When the terminal device does not receive group paging for the first service, the terminal device receives a group paging message or a unicast paging message sent by the access network device, where the group paging message or the unicast paging message is used to re-initiate paging for the first service to the terminal device.

According to an eighth aspect, an embodiment of this application provides a service paging method. The method is applied to a core network device, and may include:

The core network device sends a third message to an access network device, where the third message includes a third paging identifier, the third paging identifier is used to replace, during second paging, a first paging identifier to identify a first service, the first paging identifier is used to identify the first service during first paging, and the second paging is next paging of the first paging.

In this embodiment of this application, when performing the second paging, the core network device replaces the first paging identifier with the third paging identifier to identify the first service. To be specific, when indicating the access network device to initiate the second paging to a terminal device, the core network device uses the third paging identifier instead of the first paging identifier. In conclusion, the core network device continuously updates an identifier of the first service in a process of sending a plurality of messages to the access network device, so that different identifiers are used for a plurality of messages used by the core network device to indicate the access network device. Therefore, in a plurality of paging processes, a case in which the first service is easily tracked by an eavesdropper is avoided because the identifier of the first service is changed, and service security is improved.

In a possible implementation, the third message is a session indication message or a NAS message, and the session indication message indicates the access network device to stop, activate, or release a session of the first service.

In this embodiment of this application, the third message is a session indication message or a NAS message, and the core network device may deliver the third paging identifier to the access network device or the terminal device in advance by using the session indication message or the NAS message before the second paging is started. In this embodiment of this application, before the second paging is initiated, the access network device and the terminal device can determine an identifier to be used for the second paging. In this way, it can be ensured that normal paging is performed by using an updated identifier, and further it can be ensured that service security is improved.

In a possible implementation, the third message is a core network paging message, the core network paging message indicates the access network device to perform the second paging on the terminal device, and the second paging is the next paging of the first paging.

In this embodiment of this application, the core network device indicates, by using the core network paging message, the access network device to perform the second paging on the terminal device, and a service that the second paging is specific to is the first service identified by the third paging identifier. In this embodiment of this application, the identifier used to indicate to initiate the first service is updated, and the third paging identifier is used to replace the first paging identifier to indicate to initiate the second paging for the first service, so that different identifiers are used for a plurality of messages used by the core network device to indicate the access network device. Therefore, in a plurality of paging processes, a case in which the first service is easily tracked by the eavesdropper is avoided because the identifier that identifies the first service is changed, and service security is improved.

In a possible implementation, the third paging identifier is an MBS session identifier, a TMGI, or an IP multicast address.

In this embodiment of this application, in a paging scenario for a multicast and broadcast service, a used identifier is an MBS session identifier, a TMGI, or an IP multicast address. In this embodiment of this application, the identifier of the multicast and broadcast service is updated, so that different identifiers are used for a plurality of messages used by the core network device to indicate the access network device. Therefore, in a plurality of paging processes, a case in which the multicast and broadcast service is easily tracked by the eavesdropper is avoided because the identifier that identifies the multicast and broadcast service is changed, and security of the multicast and broadcast service is improved.

In a possible implementation, the method further includes: When the terminal device joins a service group of the first service, the core network device sends a NAS message to the terminal device, where the NAS message includes the first paging identifier, and the first paging identifier is used to identify the first service during the first paging on the terminal device.

In this embodiment of this application, when the terminal device joins the service group of the first service, the core network device sends the NAS message to the terminal device, and the terminal device may learn of the first paging identifier used to identify the first service during the first paging from the NAS message. Therefore, a prerequisite can be provided for normal implementation of paging performed for the first service by using the updated identifier.

In a possible implementation, the third paging identifier is an identifier for which a mapping relationship with an MBS session identifier, a TMGI, or an IP multicast address is established.

In this embodiment of this application, in a paging scenario for a multicast and broadcast service, an identifier that has a mapping relationship with an MBS session identifier, a TMGI, or an IP multicast address is used. In this embodiment of this application, mapping processing is first performed on the identifier, to implement anonymization. If update and/or security processing are/is further performed on the identifier on which mapping processing is performed, difficulty of tracking the service by the eavesdropper can be further increased, to further improve security of the multicast and broadcast service.

In a possible implementation, the method further includes: When the terminal device does not receive group paging for the first service, the core network device sends a core network paging message or a unicast paging message, where the core network paging message or the unicast paging message indicates the access network device to re-initiate paging for the first service to the terminal device.

In this embodiment of this application, when the terminal device does not receive the current group paging or encounters a receiving error, the core network device sends the core network paging message, to indicate the access network device to re-initiate paging to the terminal device; or the core network device sends the unicast paging message, to indicate the access network device to separately re-initiate paging to terminal devices that do not receive the current group paging or encounter a receiving error. Therefore, it can be ensured that all terminal devices interested in the MBS service can normally enter a connected mode to receive service data. In addition, in a scenario in which the updated identifier is used, a case in which because access is missed, the terminal device cannot learn, in advance, of an updated identifier to be used for next paging can be avoided. This can ensure that the updated identifier can be normally used. Therefore, quality of service of the first service can be improved, and security of the first service can be ensured.

According to a ninth aspect, an embodiment of this application provides a service paging method. The method is applied to a core network device, and may include:

The core network device sends a core network paging message to an access network device, where the core network paging message includes a first paging identifier and a second paging identifier, the first paging identifier is used to identify a first service during first paging, the second paging identifier is used to identify the first service during second paging, and the core network paging message indicates the access network device to initiate the first paging for the first service.

In this embodiment of this application, the core network paging message carries the first paging identifier and the second paging identifier that are to be used for the first paging and the second paging. When receiving an indication for initiating the first paging to a terminal device, the access network device may learn in advance that an identifier to be used to indicate to initiate the second paging for the first service is the second paging identifier. Therefore, before the second paging is initiated, the access network device may deliver the second paging identifier to the terminal device in advance by using an RRC message. When the access network device performs the second paging on the terminal device by replacing the first paging identifier with the second paging identifier, the terminal device may determine the first service based on the second paging identifier. Therefore, different identifiers are used for a plurality of times of paging initiated by the access network device to the terminal device for the first service. Therefore, in a plurality of paging processes, a case in which the first service is easily tracked by an eavesdropper is avoided because an identifier of the first service is changed, and service security is improved.

In a possible implementation, the method further includes: When the terminal device does not receive group paging for the first service, the core network device sends a core network paging message or a unicast paging message, where the core network paging message or the unicast paging message indicates the access network device to re-initiate paging for the first service to the terminal device.

According to a tenth aspect, an embodiment of this application provides a service paging method. The method is applied to a core network device, and may include:

The core network device sends a NAS message or a session indication message, where the NAS message or the session indication message includes one or more of a paging identifier update rule, an initial paging identifier, and a parameter required for updating a paging identifier, and the parameter required for updating a paging identifier may be a quantity of updates to be made based on the initial paging identifier or a first paging identifier according to the paging identifier update rule; and the core network device sends a core network paging message to an access network device, where the core network paging message includes a second paging identifier, the second paging identifier is used to identify a first service, and the core network paging message indicates the access network device to initiate second paging to a terminal device for the service.

In this embodiment of this application, one or more of the paging identifier update rule, the initial paging identifier, and the parameter required for updating a paging identifier may be delivered by the core network device by using the NAS message or the session indication message when the terminal device joins a service group of the first service, or may be specified in a protocol. In this way, when learning, by using the NAS message, of the parameter required for updating a paging identifier, the access network device and the terminal device may update the initial paging identifier or the first paging identifier for a specific quantity of times according to the paging identifier update rule, to learn, in advance, of an identifier to be used for next paging for the first service. Therefore, it can be ensured, by adjusting and updating a parameter, that different identifiers are used for a plurality of messages used by the core network device to indicate the access network device. Therefore, in a plurality of paging processes, a case in which the first service is easily tracked by an eavesdropper is avoided because an identifier that identifies the first service is changed, and security of the first service is improved.

In a possible implementation, the method further includes: When the terminal device does not receive group paging for the first service, the core network device sends a core network paging message or a unicast paging message, where the core network paging message or the unicast paging message indicates the access network device to re-initiate paging for the first service to the terminal device.

According to an eleventh aspect, an embodiment of this application provides a service paging method. The method is applied to a core network device, and may include: The core network device sends a core network paging message, where the core network paging message includes a fourth paging identifier, the core network paging message indicates an access network device to initiate paging to a terminal device for a first service, and the fourth paging identifier may be obtained by performing security processing on an MBS session identifier, a TMGI, an IP multicast address, or a mapping identifier of an MBS session identifier, a TMGI, or an IP multicast address.

In this embodiment of this application, before paging is initiated, all of the core network device, the access network device, and the terminal device learn, in advance, of security information of security processing. The security information includes one or more of a key, a security input parameter, and a security algorithm. The security information may be delivered by the core network device by using a NAS message or a session indication message when the terminal device joins a service group of the first service, or may be specified in a protocol. In this way, when receiving an identifier on which security processing (for example, encryption) is performed, the access network device and the terminal device may correspondingly decrypt the identifier based on the security information, to determine that the identifier is specific to the first service. However, due to a lack of the security information, it is difficult for an eavesdropper to obtain content existing after security processing. Therefore, difficulty of tracking the service by the eavesdropper can be increased, to improve security of the first service.

In a possible implementation, the method further includes: When the terminal device does not receive group paging for the first service, the core network device sends a core network paging message or a unicast paging message, where the core network paging message or the unicast paging message indicates the access network device to re-initiate paging for the first service to the terminal device.

According to a twelfth aspect, an embodiment of this application provides an access network device. The access network device may include a unit and/or a module configured to perform the service paging method provided in one or more of the first aspect, the second aspect, the third aspect, and the fourth aspect, or any one or more of the possible implementations of any one of the first aspect, the second aspect, the third aspect, and the fourth aspect. Therefore, beneficial effects (or advantages) of the service paging method can also be implemented.

According to a thirteenth aspect, an embodiment of this application provides a terminal device. The terminal device may include a unit and/or a module configured to perform the service paging method provided in one or more of the fifth aspect, the sixth aspect, and the seventh aspect, or any one or more of the possible implementations of any one of the fifth aspect, the sixth aspect, and the seventh aspect. Therefore, beneficial effects (or advantages) of the service paging method can also be implemented.

According to a fourteenth aspect, an embodiment of this application provides a core network device. The core network device may include a unit and/or a module configured to perform the service paging method provided in one or more of the eighth aspect, the ninth aspect, the tenth aspect, and the eleventh aspect, or any one or more of the possible implementations of any one of the eighth aspect, the ninth aspect, the tenth aspect, and the eleventh aspect. Therefore, beneficial effects (or advantages) of the service paging method can also be implemented.

According to a fifteenth aspect, an embodiment of this application provides a network device. The network device includes a processor. The processor is configured to support the network device in implementing a corresponding function in the service paging method provided in one or more of the first aspect, the second aspect, the third aspect, the fourth aspect, the fifth aspect, the sixth aspect, the seventh aspect, the eighth aspect, the ninth aspect, the tenth aspect, and the eleventh aspect. The network device may further include a memory. The memory is coupled to the processor. The memory stores program instructions and data that are necessary for the network device. The network device may further include a communication interface, configured to implement communication between the network device and another device or a communication network.

According to a sixteenth aspect, an embodiment of this application provides a computer-readable storage medium, configured to store computer software instructions to be used by a processor in the paging device apparatus provided in one or more of the twelfth aspect, the thirteenth aspect, and the fourteenth aspect. The computer software instructions include a program designed for executing the foregoing aspects.

According to a seventeenth aspect, this application provides a chip system. The chip system includes a processor, configured to support a device in implementing a function in one or more of the first aspect, the second aspect, the third aspect, the fourth aspect, the fifth aspect, the sixth aspect, the seventh aspect, the eighth aspect, the ninth aspect, the tenth aspect, and the eleventh aspect, for example, generating or processing information in the terminal suspension restoration method. In a possible design, the chip system further includes a memory, and the memory is configured to store program instructions and data that are necessary for the device. The chip system may include a chip, or may include a chip and another discrete device.

BRIEF DESCRIPTION OF DRAWINGS

To describe the technical solutions in embodiments of this application or in the background more clearly, the following describes the accompanying drawings that need to be used in embodiments of this application or the background.

DESCRIPTION OF EMBODIMENTS

Figure 1A:
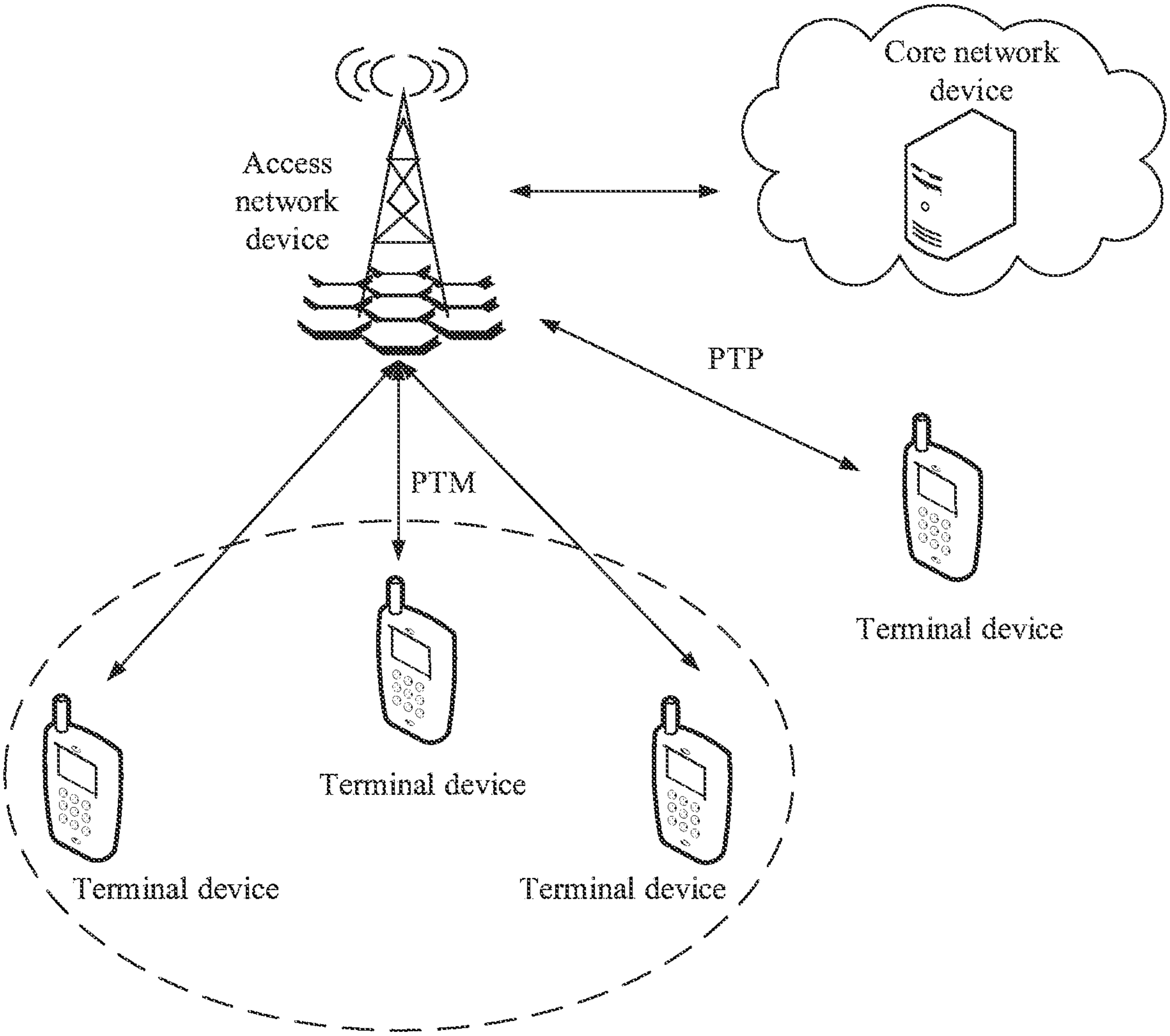
FIG. 1*a* is a schematic architectural diagram of a communication system of an MBS service.

The following describes embodiments of this application with reference to the accompanying drawings in embodiments of this application.

In the specification, claims, and accompanying drawings of this application, the terms "first", "second", "third", "fourth", and the like are used to distinguish between different objects, and are not used to describe a particular order. In addition, the terms "include" and "have", and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device. An "embodiment" in this specification means that a specific feature, structure, or characteristic described with reference to the embodiment may be included in one or more embodiments of this application. The phrase appearing at various locations in this specification neither necessarily means a same embodiment, nor means an independent or optional embodiment exclusive from another embodiment. It is explicitly and implicitly understood by persons skilled in the art that embodiments described in this specification may be combined with another embodiment.

The terms such as "component", "module", and "system" used in this specification represent computer-related entities, hardware, firmware, combinations of hardware and software, software, or software being executed. For example, a component may be but is not limited to a process that runs on a processor, a processor, an object, an executable file, an execution thread, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. The components may communicate by using a local and/or remote process and based on, for example, a signal having one or more data packets (for example, data from two components interacting with another component in a local system, a distributed system, and/or across a network such as the Internet interacting with other systems by using the signal).

Some terms in this application are first described, to help persons skilled in the art have a better understanding.

(1) A non-access stratum (Non-Access Stratum, NAS) procedure means that communication between a core network device and a terminal device is completed by using an access network device to perform message forwarding, and the access network device only transparently forwards a message without changing message content. In the solutions of this application, a message of the NAS procedure may be used to transmit an identifier of a Multicast and Broadcast Service (MBS) service, parameter information of update processing, and parameter information of security processing.

(2) Radio resource control (Radio Resource Control, RRC) means to allocate radio resources and send related signaling. RRC signaling carries all parameters required for establishing, modifying, and releasing layer 2 and physical layer protocol entities, and further carries some non-access stratum (NAS) signaling, for example, signaling used for mobility management or session management. In the solutions of this application, the RRC signaling may be used to transmit an identifier of an MBS service, parameter information of update processing, and parameter information of security processing.

(3) Unicast is a mode in which a network side communicates with a terminal device for a dedicated service of the terminal device. A network communicates with the terminal device through a dedicated connection to the terminal device. In the solutions of this application, when the terminal device fails to receive paging for a multicast service, the network side may initiate unicast paging to enable the terminal device to enter a connected mode.

(4) Multicast or multicast is a mode in which a network side communicates with a group of terminal devices for a common service of the group of terminal devices, to be specific, terminal devices that join a same multicast group may simultaneously receive a multicast service for the multicast group. The terminal device may make a request to a network device to join or leave a group, and the network device transmits data of a service in the group only to a terminal device that joins the group. In this way, data can be transmitted, at a time, to a plurality of terminal devices (namely, terminal devices that join the group) that need the data, and it can be ensured that other communication of another terminal device (namely, a terminal device that does not join the group) that does not need the data is not affected.

(5) Broadcast is a communication mode used by a network side to send a service to all terminal devices, is performed by using a broadcast transmission mode, and has no requirement on an RRC state of the terminal devices. All terminal devices in a network can receive a broadcast service.

(6) Security processing includes encryption, decryption, integrity protection, and integrity verification. In the solutions of this application, an embodiment in which service paging is performed by using an identifier on which security processing is performed is provided, to improve service security.

A multicast and broadcast service (Multicast and Broadcast Service, MBS) is usually oriented to a plurality of terminals, and service data is from a data server. FIG. 1*a* is a schematic architectural diagram of a communication system of an MBS service. First, the data server sends MBS data to a core network device, then the core network device sends the MBS data to an access network device through a public transmission channel, namely, an MBS session, and finally, the access network device may send the MBS data to one or more terminal devices (User Equipment, UE) in a point-to-point (point-to-point, PTP) or point-to-multipoint (point-to-multipoint, PTM) transmission manner.

For ease of better understanding the solutions of this application, the following first briefly describes paging processes of unicast paging and group paging.

For a unicast service, when service data arrives, if UE is in an idle (IDLE) mode or an inactive (INACTIVE) mode, a network side needs to first page the UE to complete transmission of the service data. To reduce power consumption, the UE in the idle or inactive mode uses a discontinuous reception (DRX) mode to monitor paging. In each DRX cycle, the UE monitors one monitoring occasion (PO). The network side may send a paging frame to the UE on the PO. The UE monitors and parses content indicated by a downlink control indicator (Downlink Control Indicator, DCI) corresponding to paging, and the UE learns, based on the content indicated by the DCI, whether the UE is paged. The paging frame is a radio frame (PF), and includes one or more POs or a start location of a single PO. Related formulas for determining the PF and the PO for paging are as follows.

(1) A formula for determining a system frame number (System Frame Number, SFN) of the PF is as follows:

$$(\mathrm{SFN}+\mathrm{PF\_offset})\bmod T=(T \operatorname{div} N)*(\mathrm{UE\_ID} \bmod N)$$

(2) A formula for determining a PO subscript is as follows:

$$i\_s=\mathrm{floor}(\mathrm{UE\_ID}/N) \bmod Ns$$

A physical downlink control channel (Physical Downlink Control Channel, PDCCH) monitoring occasion for paging is related to the PO subscript. Herein, PF_offset is an offset value provided by a broadcast message SIB 1 for determining the PF, N is a total quantity of PFs in a DRX cycle T, UE_ID is determined based on an ID of the UE, Ns represents a quantity of POs within a PF, mod represents a division and remainder operation, div represents a division and quotient operation, and floor represents a rounding down operation.

It should be noted that if the network side needs to page specific UE based on a unicast service, a core network device separately sends a radio message to a radio access network (Radio Access Network, RAN) node in a tracking area in which the UE is located, and the RAN node determines a PO based on a UE ID and a DRX parameter in the radio message, and sends a paging message to the UE on the PO.

However, in an MBS service scenario, when MBS service data arrives, all UEs that join an MBS service group need to be notified. Therefore, a network side needs to page a large quantity of UEs. In this case, two methods may be considered:

In a first method, the network side needs to calculate a PO corresponding to each UE based on different UE identifiers (IDs), and send a paging message on the PO corresponding to each UE. The paging message carries an MBS service identifier. The MBS service identifier may be an MBS session identifier, a temporary mobile group identity (TMGI), or an Internet Protocol (IP) multicast address.

In a second method, the network side needs to calculate a PO corresponding to an MBS service based on an MBS service identifier, and a plurality of UEs that receive the MBS service monitor a paging message on the PO. The paging message also needs to carry the MBS service identifier. The MBS service identifier may be an MBS session identifier, a TMGI, or an IP multicast address. It should be noted that the UE ID in the foregoing formula needs to be replaced with an ID of the MBS service or another public identifier to calculate the PO corresponding to the MBS service.

Figure 1B:
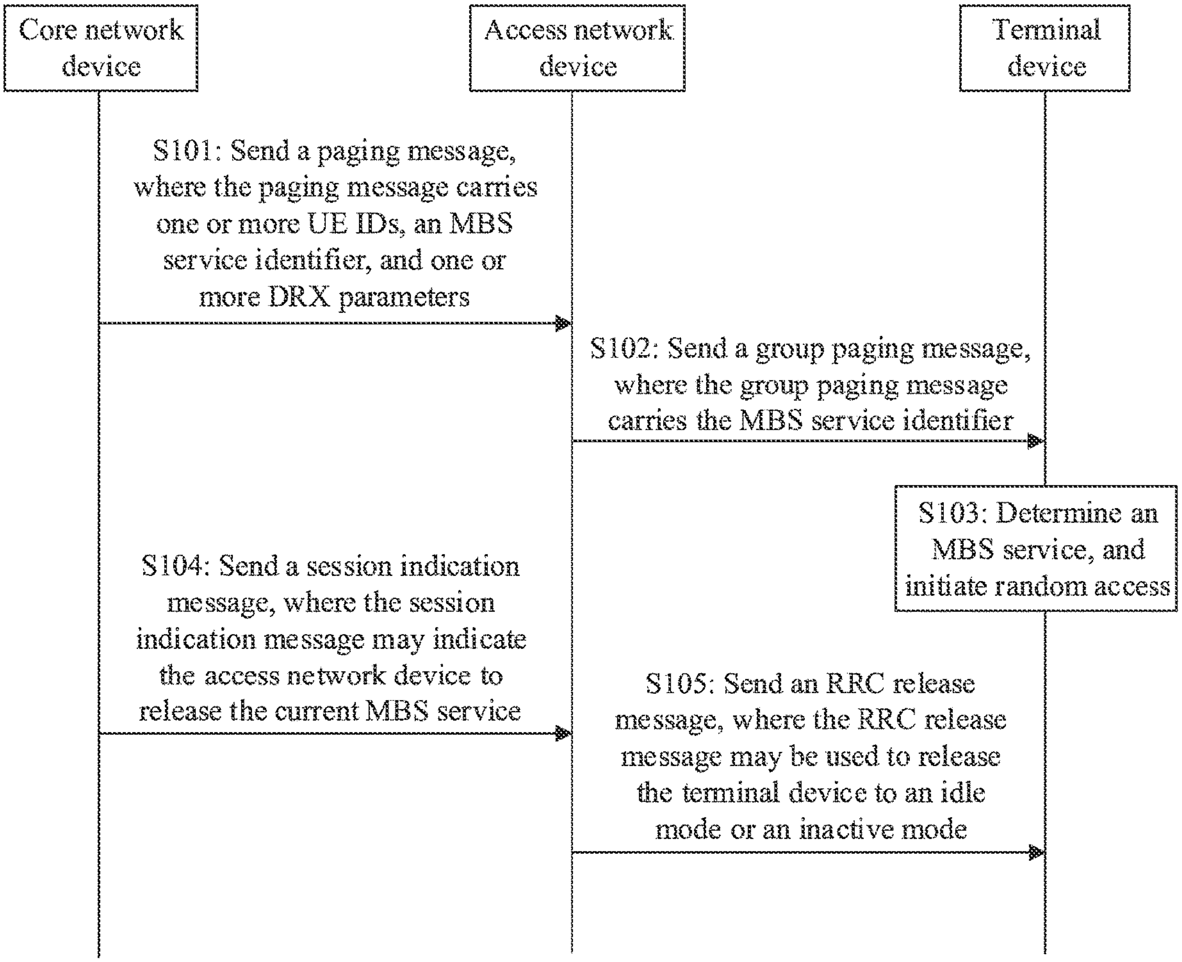
FIG. 1B is a schematic flowchart of MBS service paging.

A specific technical problem to be resolved in this application is first analyzed and provided. In the conventional technology, a paging solution for an MBS service includes the following steps. FIG. 1B is a schematic flowchart of MBS service paging.

Step S101: When an MBS service needs to be initiated, a core network device needs to notify an access network device by using a paging message, where the paging message includes the following content: one or more UE IDs, an MBS service identifier, and one or more DRX parameters.

Step S102: The access network device determines, based on the paging message sent by the core network device, a time domain location at which a PO on which a group paging message needs to be sent is located, and then sends the group paging message to a terminal device. The group paging message carries the MBS service identifier.

Step S103: After receiving the group paging message, the terminal device determines a specific MBS service based on the MBS service identifier, and initiates random access.

Step S104: The core network device sends an indication message to the access network device, to suspend, stop, activate, or release the MBS service.

Step S105: The access network device sends an RRC release message to the terminal device, and the terminal device enters an idle mode or an inactive mode.

Based on the foregoing steps, the existing paging solution for an MBS service has the following disadvantages:

Disadvantage 1: In a group paging process, an MBS service identifier used for a same MBS service remains unchanged for a long time. Consequently, it is easy to track the MBS service.

Disadvantage 2: In the group paging process, the MBS service identifier in a plaintext form is carried. Consequently, it is easy to track the MBS service.

To resolve a problem that a service identifier is easily eavesdropped in a current group paging process, and improve security of an MBS service, the disadvantages of the conventional technology are comprehensively considered in this application, and a technical problem to be resolved includes the following aspects:

1. Update of an identifier (disadvantage 1 of the solution 1): In a group paging process, an MBS service identifier used for a same MBS service remains unchanged for a long time. Consequently, it is easy to track the MBS service. Therefore, a service identifier update mechanism is introduced, so that a different identifier is used for performing paging for the same MBS service each time. In this way, tracking difficulty can be increased, to improve security of the MBS service.
2. Security processing of an identifier (disadvantage 2 of the solution 1): In the group paging process, the MBS service identifier in a plaintext form is carried. Consequently, it is easy to track the MBS service. Therefore, security processing is performed on the MBS service identifier. In this way, tracking difficulty can be increased, to improve security of the MBS service. In conclusion, the existing paging solution for an MBS service cannot meet a higher requirement for service security. Therefore, the service paging method provided in this application is used to resolve the foregoing technical problem.

To better understand the service paging method provided in embodiments of this application, the following describes a system architecture and/or an application scenario of the multicast and broadcast service paging method provided in embodiments of this application. It may be understood that the scenario described in embodiments of this application is intended to describe the technical solutions in embodiments of this application more clearly, and does not constitute a limitation on the technical solutions provided in embodiments of this application. Based on the schematic architectural diagram of the communication system of the MBS service provided in FIG. 1*a* and the schematic flowchart of MBS service paging provided in FIG. 1*b*, the technical problem provided in this application is analyzed and resolved in detail with reference to the multicast and broadcast service paging method provided in this application.

The system architecture used in the multicast and broadcast service paging method provided in embodiments of this application may include one or more terminal devices, one or more access network devices, and one or more core network devices.

The terminal device is an entity configured to receive or transmit a signal, and mainly implements a function of performing wireless communication with a base station. The terminal device may be an access terminal, a UE unit, a UE station, a mobile station, a remote station, a remote terminal, a mobile device, a UE terminal, a terminal, a wireless communication device, a multimedia device, a streaming media device, a UE agent, a UE apparatus, or the like. The access terminal may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, a vehicle-mounted device, a wearable device, a terminal in a future 5G network, a terminal in a future evolved public land mobile network (public land mobile network, PLMN), or the like.

The access network device is an entity, on a network side, configured to transmit or receive a signal, and mainly implements a function of communicating with a user terminal device and the core network device. The access network device may be a base station, a relay station, or an access point. The base station may be a base transceiver station (Base Transceiver Station, BTS) in a global system for mobile communications (Global system for mobile communications, GSM) or a code division multiple access (Code Division Multiple Access, CDMA) network, may be a Node Base station (Node Base station, NB) in wideband code division multiple access (Wideband Code Division Multiple Access, WCDMA), may be an evolved (evolved) NB (eNB or eNodeB) in long term evolution (Long Term Evolution, LTE), may be a radio controller in a cloud radio access network (Cloud Radio Access Network, CRAN) scenario, may be a base station device in a future 5G network or an access network device in a future evolved PLMN network, or may be a wearable device, a vehicle-mounted device, or the like.

Figure 2:
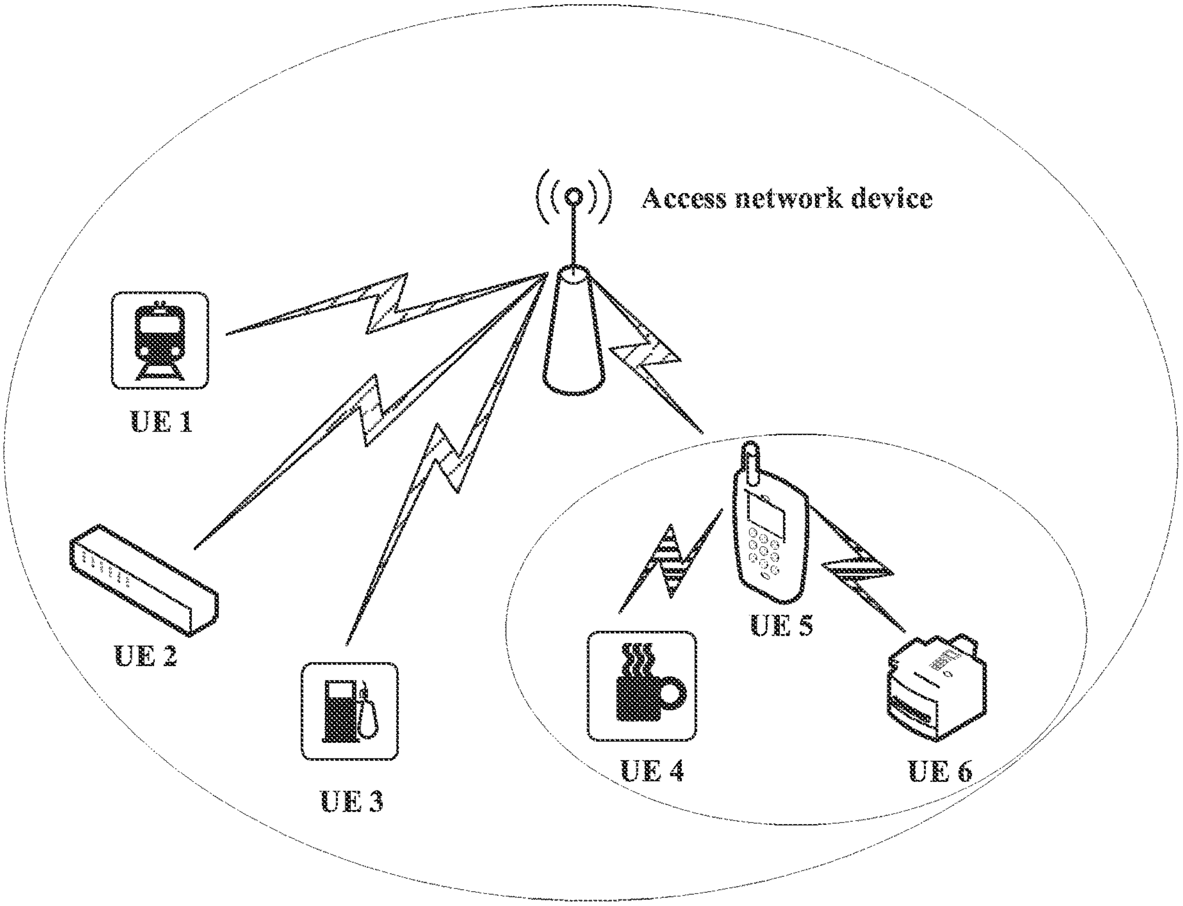
FIG. 2 is a schematic diagram of a scenario of an MBS service according to an embodiment of this application.

The core network device may correspond to different devices in different systems, and communicate with UE through the access network device. For example, the core network device may correspond to a serving general packet radio service (General Packet Radio Service, GPRS) support node (Serving GPRS Support Node, SGSN) and/or a gateway GPRS support node (Gateway GPRS Support Node, GGSN) in 3G; may correspond to a mobility management entity (Mobility Management Entity, MME) and/or a serving gateway (Serving Gateway, S-GW) in 4G; and may correspond to an access and mobility management function (Access and Mobility Management Function, AMF) unit, a session management function (Session Management Function, SMF) unit, or a user plane function (User plane Function, UPF) unit in 5G. It should be noted that embodiments of this application may be applied to various communication systems, provided that in the communication systems, there is an entity that needs to send information and there is another entity that needs to receive the information. FIG. 2 is a schematic diagram of a scenario of an MBS service according to an embodiment of this application. An access network device and UE 1 to UE 6 form a communication system. In the communication system, the UE 1 to the UE 6 may send uplink data to the access network device, and the access network sends downlink data to the UE 1 to the UE 6. In addition, UE 4 to the UE 6 may form a communication system. In the communication system, the access network device may send downlink information to the UE 1, UE 2, UE 5, and the like. The UE 5 may also send downlink information to the UE 4 and the UE 6. The UE 4 and the UE 6 may also send uplink information to a base station through the UE 5. It may be understood that the communication system architecture or scenario in the foregoing figure is merely an example implementation in embodiments of this application. The communication system architecture or scenario in embodiments of this application includes but is not limited to the foregoing communication system architecture or scenario.

The technical problem provided in this application is analyzed and resolved below in detail by using a plurality of embodiments (including Embodiment 1 to Embodiment 7) of the multicast and broadcast service paging method provided in this application. Descriptions are provided from a perspective of interaction between a core network device, an access network device, and a terminal device with reference to the accompanying drawings.

Figure 3A:
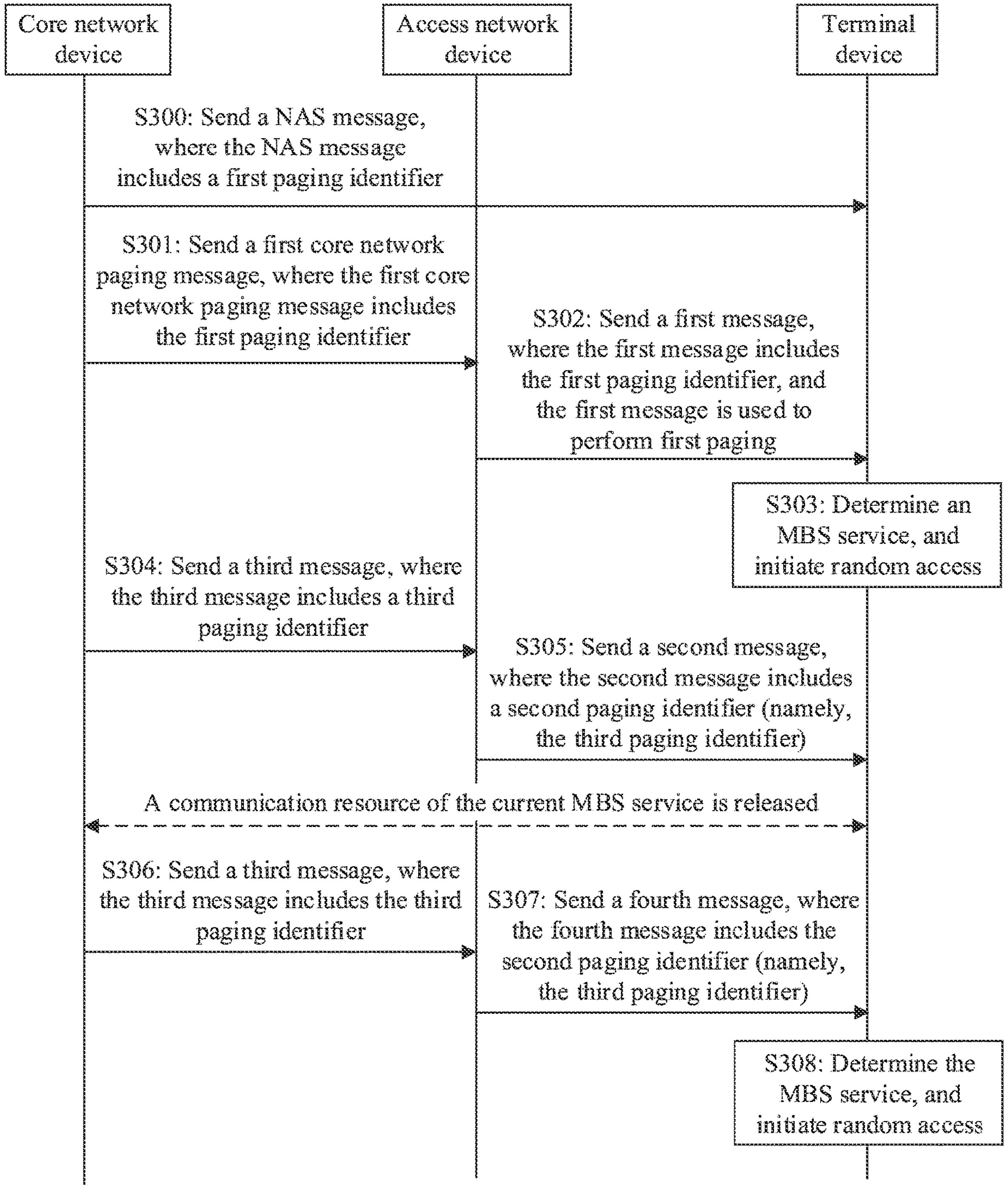
FIG. 3*a* is a schematic flowchart of an update processing-based MBS service paging method according to an embodiment of this application.

In Embodiment 1, when performing second paging for an MBS service, a core network device, an access network device, and a terminal device use an updated identifier. After a connection is established for first paging, the updated identifier may be delivered by the core network device to the access network device by using a session indication message, and then the access network device sends the updated identifier to the terminal device by using an RRC release message. Then, the terminal device monitors, by using the updated identifier, the second paging initiated by the access network device for the MBS service. The second paging is next paging of the first paging. To be specific, an identifier existing before an update is used for the first paging, and the updated identifier is used for the second paging. FIG. 3*a* is a schematic flowchart of an update processing-based MBS service paging method according to an embodiment of this application. The method may be applied to the communication system in FIG. 1*a*. The method includes the following steps S300 to S308.

Step S300: The core network device sends a NAS message to the terminal device, where the NAS message includes a first paging identifier.

Specifically, when the terminal device joins a service group of an MBS service, the core network device sends the NAS message to the terminal device. The NAS message includes the first paging identifier. The first paging identifier may be an MBS session identifier, a TMGI, or an IP multicast address, and the first paging identifier is used to identify the MBS service during first paging on the terminal device. In this way, before the first paging is initiated, the terminal device learns of an identifier to be used during the first paging. Therefore, when the access network device performs the first paging for the MBS service, the terminal device can determine, based on the first paging identifier, that the service is the MBS service. For example, the first paging identifier in this embodiment may be "MBS service 1".

Step S301: The core network device sends a first core network paging message to the access network device, where the first core network paging message includes the first paging identifier.

Specifically, the first paging identifier is used to identify the MBS service during the first paging, and the first core network paging message indicates the access network device to initiate the first paging for the MBS service. It may be understood that the first core network paging message may further include one or more terminal device IDs and DRX parameters, and the terminal device ID and the DRX parameter are used by the access network device to determine a to-be-paged terminal device and a paging moment.

Step S302: The access network device sends a first message to the terminal device, where the first message includes the first paging identifier.

Specifically, the first message may be a first group paging message, the first group paging message carries the first paging identifier "MBS service 1", and the first group paging message is used to perform the first paging on the terminal device for the MBS service.

Step S303: The terminal device determines the MBS service based on the first paging identifier, and in response to the first paging, enters a connected mode to receive the MBS service. Specifically, after receiving the first group paging message, the terminal device determines, based on the first paging identifier "MBS service 1", that the service is the MBS service. The terminal device has joined the service group of the MBS service, and is interested in the MBS service, and therefore initiates random access and enters the connected mode. After receiving configuration information sent by the access network device, the terminal device starts to receive data of the MBS service.

Step S304: The core network device sends a third message to the access network device, where the third message includes a third paging identifier.

Specifically, the third paging identifier is used to identify the MBS service during second paging, the third paging identifier may be an MBS session identifier, a TMGI, or an IP multicast address, and the second paging is next paging of the first paging. The third message may be a session indication message, indicates the access network device to suspend, stop, activate, or release a session of the MBS service, and can be used to send the third paging identifier to be used for the second paging to the access network device in advance before the second paging is performed. In this way, when performing the second paging, the access network device may perform the second paging on the terminal device by using the third paging identifier. To be specific, when performing the second paging, the access network device no longer uses the first paging identifier, but uses the third paging identifier. For example, the third paging identifier in this embodiment may be "MBS service 2".

It should be noted that the third paging identifier may be obtained by performing update processing based on the first paging identifier. An update manner may be that an update is made based on the first paging identifier by using a random function or a specific function formula. For example, a tail of the first paging identifier may be sequentially and incrementally updated. Therefore, the third paging identifier may be "MBS service 2".

Step S305: The access network device sends a second message to the terminal device, where the second message includes a second paging identifier.

Specifically, the second message may be an RRC release message, and the second paging identifier may be the third paging identifier, to be specific, the second paging identifier may be "MBS service 2". The RRC release message is used to release the terminal device to an idle mode or an inactive mode, and can be used to send the second paging identifier to be used for the second paging to the terminal device before the second paging is performed. In this way, when the access network device performs the second paging for the MBS service, the terminal device may determine, based on the second paging identifier "MBS service 2", that a service that the second paging is specific to is the MBS service.

Step S306: The core network device sends a third message to the access network device, where the third message includes the third paging identifier.

Specifically, the third message may be a second core network paging message, and indicates the access network device to initiate the second paging for the MBS service. An identifier used for the second paging is the third paging identifier. It may be understood that the second core network paging message may further include one or more terminal device IDs and DRX parameters. Details are not described herein.

Step S307: The access network device sends a fourth message to the terminal device, where the fourth message includes the second paging identifier.

Specifically, the fourth message may be a second group paging message, and the second paging identifier may be the third paging identifier, for example, the second paging identifier may be "MBS service 2". The second group paging message is used to perform the second paging on the terminal device for the MBS service, and an identifier used for the second paging performed for the MBS service is the second paging identifier "MBS service 2".

Step S308: The terminal device determines the MBS service based on the second paging identifier, and in response to the second paging, enters the connected mode to receive the MBS service.

Specifically, the access network device sends the second paging identifier "MBS service 2" to be used for the second paging to the terminal device in advance in step S305. Therefore, when receiving the second group paging message from the access network device, the terminal device can determine, based on the second paging identifier "MBS service 2", that a service that the group paging is specific to is the MBS service. After determining that the service is a service that the terminal device is interested in, the terminal device may initiate random access, enter the connected mode, and start to receive data of the MBS service after receiving the configuration information sent by the access network device.

In a possible implementation, in steps S300 to S310, the first paging identifier and the third paging identifier each may alternatively be an identifier for which a mapping relationship with an MBS session identifier, a TMGI, or an IP multicast address is established. For example, different MBS services may be mapped to different English letters, an MBS session identifier, a TMGI, or an IP multicast address of a fire communication service may be mapped to an English letter a, and an MBS session identifier, a TMGI, or an IP multicast address of a public safety communication service may be mapped to an English letter b.

Based on the foregoing method, a different identifier is used for each time of paging performed for the MBS service. In this way, difficulty of tracking the service by an eavesdropper is increased, to improve security of the MBS service.

Figure 3B:
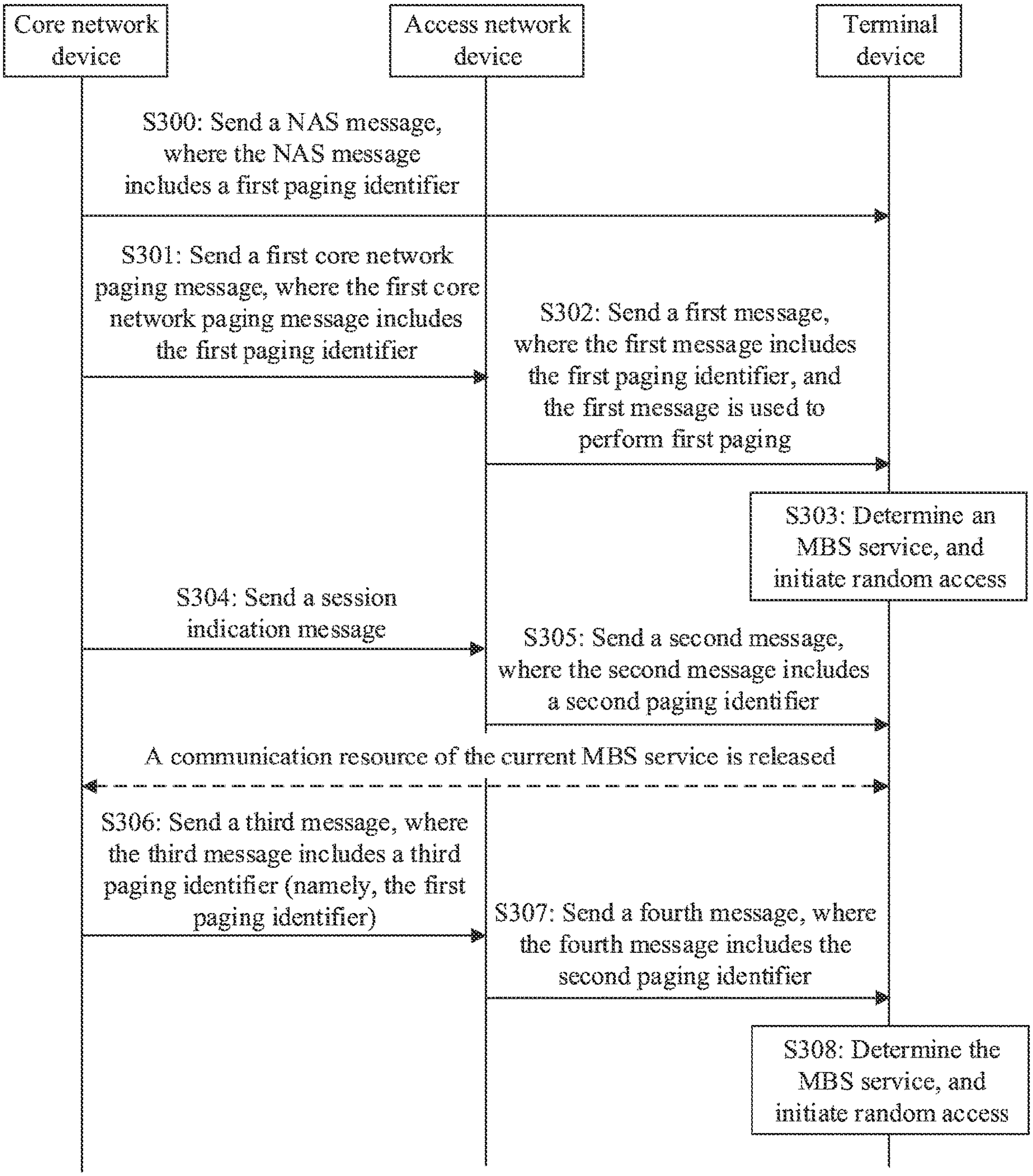
FIG. 3*b* is a schematic flowchart of another update processing-based MBS service paging method according to an embodiment of this application.

In Embodiment 2, when performing second paging for an MBS service, a core network device, an access network device, and a terminal device use an updated identifier. After a connection is established for first paging, the updated identifier may be sent by the access network device to the terminal device by using an RRC release message. Then, the terminal device monitors, by using the updated identifier, the second paging initiated by the access network device for the MBS service. The second paging is next paging of the first paging. To be specific, an identifier existing before an update is used for the first paging, and the updated identifier is used for the second paging. FIG. 3*b* is a schematic flowchart of another update processing-based MBS service paging method according to an embodiment of this application. The method may be applied to the communication system in FIG. 1*a*. The method includes the following steps S300 to S308.

Step S300: The core network device sends a NAS message to the terminal device, where the NAS message includes a first paging identifier.

Specifically, when the terminal device joins a service group of an MBS service, the core network device sends the NAS message to the terminal device. The NAS message includes the first paging identifier. The first paging identifier may be an MBS session identifier, a TMGI, or an IP multicast address, and the first paging identifier is used to identify the MBS service during first paging on the terminal device. In this way, before the first paging is initiated, the terminal device learns of an identifier to be used during the first paging. Therefore, when the access network device performs the first paging for the MBS service, the terminal device can determine, based on the first paging identifier, that the service is the MBS service. For example, the first paging identifier in this embodiment may be "MBS service 1".

Step S301: The core network device sends a first core network paging message to the access network device, where the first core network paging message includes the first paging identifier.

Specifically, the first paging identifier is used to identify the MBS service during the first paging, and the first core network paging message indicates the access network device to initiate the first paging for the MBS service. It may be understood that the first core network paging message may further include one or more terminal device IDs and DRX parameters. Details are not described herein.

Step S302: The access network device sends a first message to the terminal device, where the first message includes the first paging identifier.

Specifically, the first message may be a first group paging message, the first group paging message carries the first paging identifier "MBS service 1", and the first group paging message is used to perform the first paging on the terminal device for the MBS service.

Step S303: The terminal device determines the MBS service based on the first paging identifier, and in response to the first paging, enters a connected mode to receive the MBS service.

Specifically, after receiving the first group paging message, the terminal device determines, based on the first paging identifier "MBS service 1", that the service is the MBS service. The terminal device has joined the service group of the MBS service, and is interested in the MBS service, and therefore initiates random access and enters the connected mode. After receiving configuration information sent by the access network device, the terminal device starts to receive data of the MBS service.

Step S304: The core network device sends a session indication message to the access network device.

Specifically, the session indication message indicates the access network device to suspend, stop, activate, or release a session of the MBS service.

Step S305: The access network device sends a second message to the terminal device, where the second message includes a second paging identifier.

Specifically, the second message may be an RRC release message, is used to release the terminal device to an idle mode or an inactive mode, and can be used to send the second paging identifier to be used for second paging to the terminal device before the second paging is performed. The second paging identifier may be an MBS session identifier, a TMGI, or an IP multicast address, and the second paging is next paging of the first paging. In this way, when the access network device performs the second paging for the MBS service, the terminal device may determine, based on the second paging identifier "MBS service 2", that a service that the second paging is specific to is the MBS service. To be specific, when performing the second paging, the access network device no longer uses the first paging identifier, but uses the second paging identifier. It should be noted that the second paging identifier may be obtained by performing update processing based on the first paging identifier. An update manner may be that an update is made based on the first paging identifier by using a random function or a specific function formula. For example, a tail of the first paging identifier may be sequentially and incrementally updated. Therefore, the second paging identifier may be "MBS service 2".

Step S306: The core network device sends a third message to the access network device, where the third message includes a third paging identifier.

Specifically, the third message may be a second core network paging message, and indicates the access network device to initiate the second paging for the MBS service. The third paging identifier may be the first paging identifier "MBS service 1", and indicates that an identifier used to initiate the second paging for the MBS service is the third paging identifier, namely, the first paging identifier. It may be understood that the second core network paging message may further include one or more terminal device IDs and DRX parameters. Details are not described herein.

Step S307: The access network device sends a fourth message to the terminal device, where the fourth message includes the second paging identifier.

Specifically, the fourth message may be a second group paging message, and is used to perform the second paging on the terminal device for the MBS service, and an identifier used for the second paging performed for the MBS service is the second paging identifier "MBS service 2". Step S308: The terminal device determines the MBS service based on the second paging identifier, and in response to the second paging, enters the connected mode to receive the MBS service.

Specifically, the access network device sends the second paging identifier "MBS service 2" to be used for the second paging to the terminal device in advance in step S305. Therefore, when receiving the second group paging message from the access network device, the terminal device can determine, based on the second paging identifier "MBS service 2", that a service that the group paging is specific to is the MBS service. After determining that the service is a service that the terminal device is interested in, the terminal device may initiate random access, enter the connected mode, and start to receive data of the MBS service after receiving the configuration information sent by the access network device.

In a possible implementation, in steps S300 to S310, the first paging identifier and the second paging identifier that are sent by the access network device each may alternatively be an identifier for which a mapping relationship with an MBS session identifier, a TMGI, or an IP multicast address is established. For example, different MBS services may be mapped to different English letters, an MBS session identifier, a TMGI, or an IP multicast address of a fire communication service may be mapped to an English letter a, and an MBS session identifier, a TMGI, or an IP multicast address of a public safety communication service may be mapped to an English letter b.

Based on the foregoing method, a different identifier is used for each time of paging performed for the MBS service. In this way, difficulty of tracking the service by an eavesdropper is increased, to improve security of the MBS service.

Figure 4:
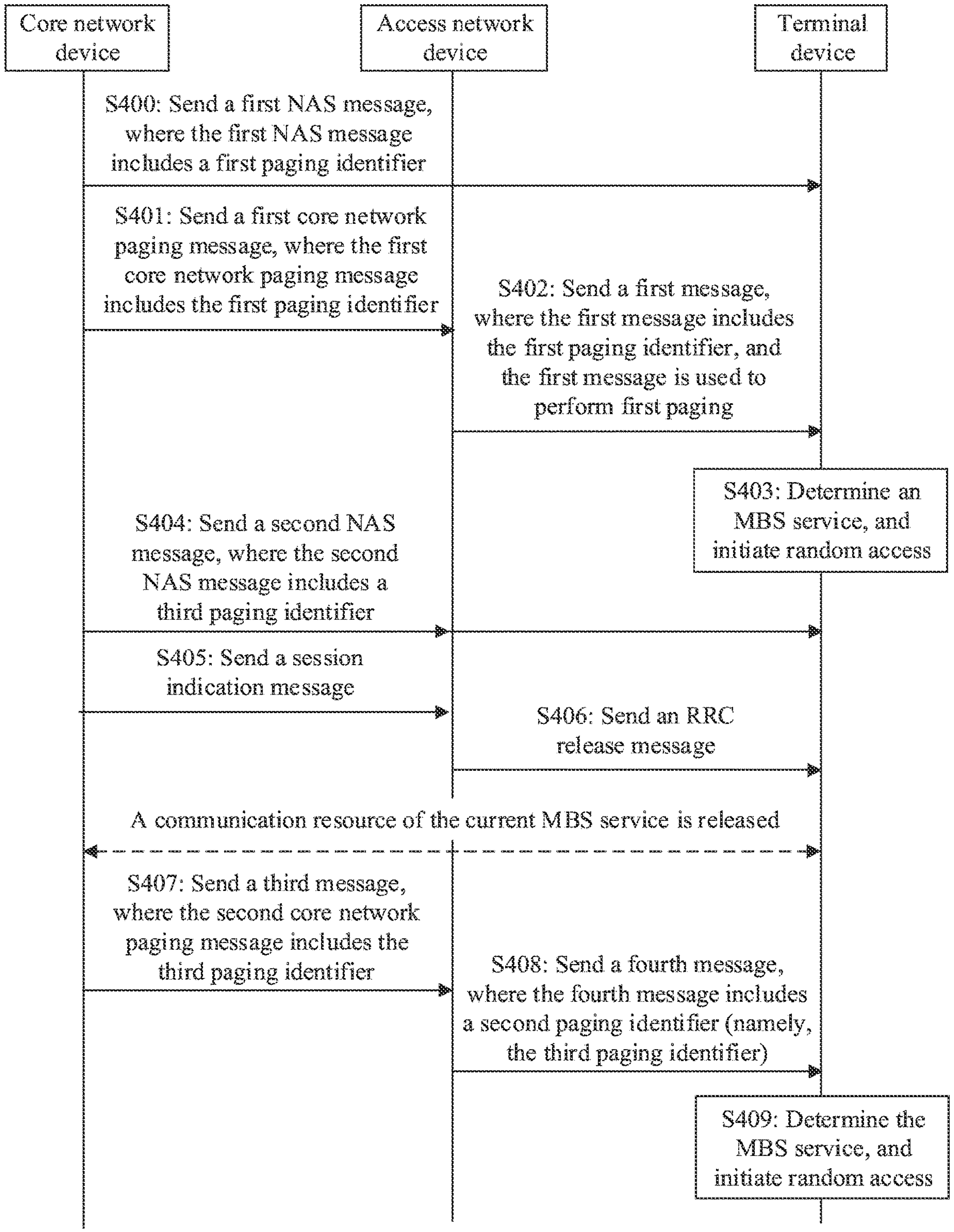
FIG. 4 is a schematic flowchart of another update processing-based MBS service paging method according to an embodiment of this application.

In Embodiment 3, when performing second paging for an MBS service, a core network device, an access network device, and a terminal device use an updated identifier. After a connection is established for first paging, the updated identifier may be delivered by the core network device to the access network device and the terminal device by using a NAS message. Then, the terminal device monitors, by using the updated identifier, the second paging initiated by the access network device for the MBS service. The second paging is next paging of the first paging. FIG. 4 is a schematic flowchart of an update processing-based MBS service paging method according to an embodiment of this application. The method may be applied to the communication system in FIG. 1*a*. The method includes the following steps S400 to S409.

Step S400: The core network device sends a first NAS message to the terminal device, where the first NAS message includes a first paging identifier.

Specifically, when the terminal device joins a service group of an MBS service, the core network device sends the first NAS message to the terminal device. The first NAS message includes the first paging identifier. The first paging identifier may be an MBS session identifier, a TMGI, or an IP multicast address, and the first paging identifier is used to identify the MBS service during first paging on the terminal device. In this way, before the first paging is initiated, the terminal device learns of an identifier to be used during the first paging. Therefore, when the access network device performs the first paging for the MBS service, the terminal device can determine, based on the first paging identifier, that the service is the MBS service. For example, the first paging identifier in this embodiment may be "MBS service 1".

Step S401: The core network device sends a first core network paging message to the access network device, where the first core network paging message includes the first paging identifier.

Specifically, the first paging identifier is used to identify the MBS service during the first paging, and the first core network paging message indicates the access network device to initiate the first paging for the MBS service. It may be understood that the first core network paging message may further include one or more terminal device IDs and DRX parameters. Details are not described herein.

Step S402: The access network device sends a first message to the terminal device, where the first message includes the first paging identifier.

Specifically, the first message may be a first group paging message, the first group paging message carries the first paging identifier "MBS service 1", and the first group paging message is used to perform the first paging on the terminal device for the MBS service.

Step S403: The terminal device determines the MBS service based on the first paging identifier, and in response to the first paging, enters a connected mode to receive the MBS service.

Specifically, after receiving the first group paging message, the terminal device determines, based on the first paging identifier "MBS service 1", that the service is the MBS service. The terminal device has joined the service group of the MBS service, and is interested in the MBS service, and therefore initiates random access and enters the connected mode. After receiving configuration information sent by the access network device, the terminal device starts to receive data of the MBS service.

Step S404: The core network device sends a third message to the terminal device, where the third message includes a third paging identifier.

Specifically, the third paging identifier is used to identify the MBS service during second paging, the third paging identifier may be an MBS session identifier, a TMGI, or an IP multicast address, and the second paging is next paging of the first paging. The third message may be a second NAS message, and can be used to send the third paging identifier to be used for the second paging to the access network device and the terminal device in advance before the second paging is performed. In this way, when performing the second paging, the access network device may perform the second paging on the terminal device by using the third paging identifier. To be specific, when performing the second paging, the access network device no longer uses the first paging identifier, but uses the third paging identifier.

It should be noted that the third paging identifier may be obtained by performing update processing based on the first paging identifier. An update manner may be that an update is made based on the fourth paging identifier by using a random function or a specific function formula. For example, a tail of the first paging identifier may be sequentially and incrementally updated. Therefore, the third paging identifier is "MBS service 2".

Step S405: The core network device sends a session indication message to the access network device.

Specifically, the session indication message indicates the access network device to suspend, stop, activate, or release a session of the MBS service.

Step S406: The access network device sends an RRC release message to the terminal device.

Specifically, the RRC release message is used to release the terminal device to an idle mode or an inactive mode.

Step S407: The core network device sends a third message to the access network device, where the third message includes the third paging identifier.

Specifically, the third message may be a second core network paging message, and indicates the access network device to initiate the second paging for the MBS service. An identifier used for the second paging is the third paging identifier. It may be understood that the second core network paging message may further include one or more terminal device IDs and DRX parameters. Details are not described herein.

Step S408: The access network device sends a fourth message to the terminal device, where the fourth message includes a second paging identifier.

Specifically, the fourth message may be a second group paging message, and the second paging identifier may be the third paging identifier, to be specific, the second paging identifier may be "MBS service 2". The second group paging message is used to perform the second paging on the terminal device for the MBS service, and an identifier used for the second paging performed for the MBS service is the second paging identifier "MBS service 2".

Step S409: The terminal device determines the MBS service based on the second paging identifier, and in response to the second paging, enters the connected mode to receive the MBS service.

Specifically, the core network device sends the second paging identifier "MBS service 2" to be used for the second paging to the terminal device in advance in step S404. Therefore, when receiving the second group paging message from the access network device, the terminal device can determine, based on the second paging identifier "MBS service 2", that the service is the MBS service. After determining that the service is a service that the terminal device is interested in, the terminal device may initiate random access, enter the connected mode, and start to receive data of the MBS service after receiving the configuration information sent by the access network device.

In a possible implementation, in steps S400 to S409, the first paging identifier and the third paging identifier each may alternatively be an identifier for which a mapping relationship with an MBS session identifier, a TMGI, or an IP multicast address is established. Details are not described herein.

Based on the foregoing method, a different identifier is used for each time of paging performed for the MBS service. In this way, difficulty of tracking the service by an eavesdropper is increased, to improve security of the MBS service.

Figure 5:
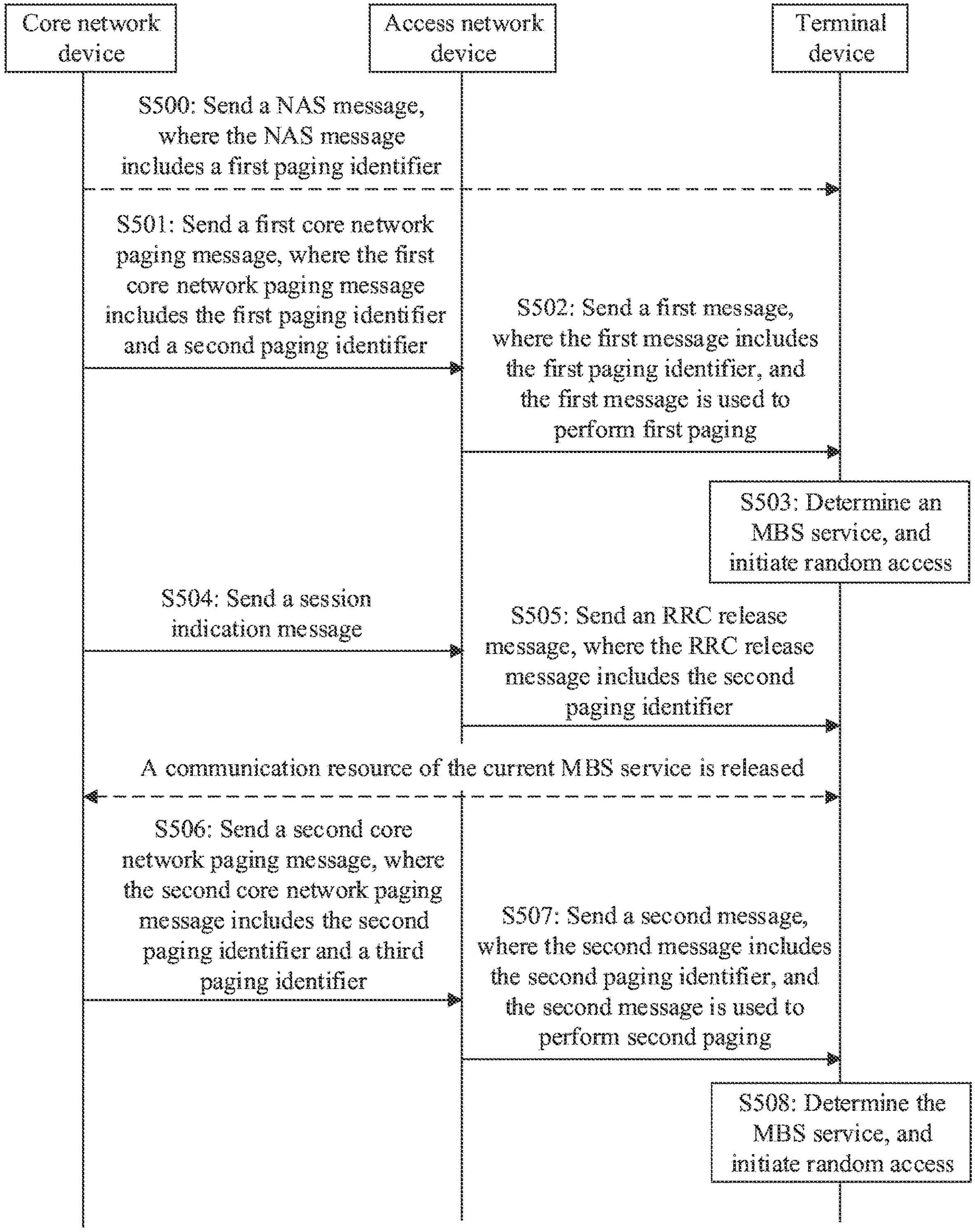
FIG. 5 is a schematic flowchart of another update processing-based MBS service paging method according to an embodiment of this application.

In Embodiment 4, when performing second paging for an MBS service, a core network device, an access network device, and a terminal device use an updated identifier. The updated identifier is in a core network paging message used by the core network device to indicate the access network device to initiate first paging. The second paging is next paging of the first paging. Then, the terminal device monitors, by using the updated identifier, the second paging initiated by the access network device for the MBS service. The core network paging message may not only carry the identifier to be used for the second paging, but also carry a plurality of identifiers to be used for a plurality of subsequent times of paging. FIG. 5 is a schematic flowchart of another update processing-based MBS service paging method according to an embodiment of this application. The method may be applied to the communication system in FIG. 1*a*. The method includes the following steps S500 to S508.

Step S500: The core network device sends a NAS message to the terminal device, where the NAS message includes a first paging identifier.

Specifically, when the terminal device joins a service group of an MBS service, the core network device sends the NAS message to the terminal device. The NAS message includes the first paging identifier. The first paging identifier may be an MBS session identifier, a TMGI, or an IP multicast address, and the first paging identifier is used to identify the MBS service during first paging on the terminal device. In this way, before the first paging is initiated, the terminal device learns of an identifier to be used during the first paging. Therefore, when the access network device performs the first paging for the MBS service, the terminal device can determine, based on the first paging identifier, that the service is the MBS service. For example, the first paging identifier in this embodiment may be "MBS service 1".

Step S501: The core network device sends a first core network paging message to the access network device, where the first core network paging message includes the first paging identifier and a second paging identifier.

Specifically, the first paging identifier is used to identify the MBS service during the first paging, the second paging identifier is used to identify the MBS service during second paging, and the second paging is next paging of the first paging. The first core network paging message indicates the access network device to initiate the first paging for the MBS service. In this embodiment, the first paging identifier may be "fire service 1". The second paging identifier may be obtained by performing update processing based on the first paging identifier. For specific update processing, refer to the method in the foregoing embodiments. Details are not described herein. Therefore, the second paging identifier may be "fire service 2". The second paging identifier "fire service 2" to be used for the second paging is sent to the access network device before the second paging is performed. Therefore, when performing the second paging, the access network device may perform the second paging on the terminal device by using the second paging identifier. To be specific, when performing the second paging, the access network device no longer uses the first paging identifier, but uses the second paging identifier. It may be understood that the first core network paging message may further include one or more terminal device IDs and DRX parameters. Details are not described herein.

Optionally, the first core network paging message may further carry identifiers to be used for a plurality of consecutive times of paging performed after the second paging. An identifier used for current paging may be obtained by performing update processing based on an identifier used for previous paging. For example, a third paging identifier is used for third paging, and a fourth paging identifier is used for fourth paging. The third paging is next paging of the second paging, and the fourth paging is next paging of the third paging. Identifiers used for a plurality of subsequent times of paging performed after the second paging are not listed one by one herein.

Step S502: The access network device sends a first message to the terminal device, where the first message includes the first paging identifier.

Specifically, the first message may be a first group paging message, the first group paging message carries the first paging identifier "MBS service 1", and the first group paging message is used to perform the first paging on the terminal device for the MBS service.

Step S503: The terminal device determines the MBS service based on the first paging identifier, and in response to the first paging, enters a connected mode to receive the MBS service.

Specifically, after receiving the first group paging message, the terminal device determines, based on the first paging identifier "MBS service 1", that the service is the MBS service. The terminal device has joined the service group of the MBS service, and is interested in the MBS service, and therefore initiates random access and enters the connected mode. After receiving configuration information sent by the access network device, the terminal device starts to receive data of the MBS service.

Step S504: The core network device sends a session indication message to the access network device.

Specifically, the session indication message indicates the access network device to suspend, stop, activate, or release a session of the MBS service.

Step S505: The access network device sends a second message to the terminal device, where the second message includes the second paging identifier.

Specifically, the second message may be an RRC release message, and the RRC release message is used to release the terminal device to an idle mode or an inactive mode, and can be used to send the second paging identifier to be used for second paging to the terminal device before the second paging is performed. Therefore, when the access network device performs the second paging for the MBS service, the terminal device may determine, based on the second paging identifier "MBS service 2", that a service that the second paging is specific to is the MBS service.

Step S506: The core network device sends a second core network paging message to the access network device, where the second core network paging message includes the second paging identifier and the third paging identifier.

Specifically, the second core network paging message indicates the access network device to initiate the second paging for the MBS service. An identifier used for the second paging is the second paging identifier, an identifier used for the third paging is the third paging identifier, and the third paging is the next paging of the second paging. The core network device sends the second paging identifier "MBS service 2" to the access network device in advance in step S501. Therefore, when receiving the second core network paging message, the access network device can determine, based on the second paging identifier, that the second paging is initiated for the MBS service. It may be understood that the first core network paging message may further include one or more terminal device IDs and DRX parameters. Details are not described herein.

Optionally, the second core network paging message may further carry identifiers to be used for a plurality of subsequent times of paging. Refer to step S501. Details are not described herein.

Step S507: The access network device sends a second message to the terminal device, where the second message includes the second paging identifier.

Specifically, the second message is a second group paging message, the second group paging message is used to perform the second paging on the terminal device for the MBS service, and an identifier used for the second paging performed for the MBS service is the second paging identifier "MBS service 2".

Step S508: The terminal device determines the MBS service based on the second paging identifier, and in response to the second paging, enters the connected mode to receive the MBS service.

Specifically, the access network device sends the second paging identifier "MBS service 2" to be used for the second paging to the terminal device in advance in step S305. Therefore, when receiving the second group paging message from the access network device, the terminal device can determine, based on the second paging identifier "MBS service 2", that a service that the group paging is specific to is the MBS service. After determining that the service is a service that the terminal device is interested in, the terminal device may initiate random access, enter the connected mode, and start to receive data of the MBS service after receiving the configuration information sent by the access network device.

Based on the foregoing method, a different identifier is used for each time of paging performed for the MBS service. In this way, difficulty of tracking the service by an eavesdropper is increased, to improve security of the MBS service.

Figure 6:
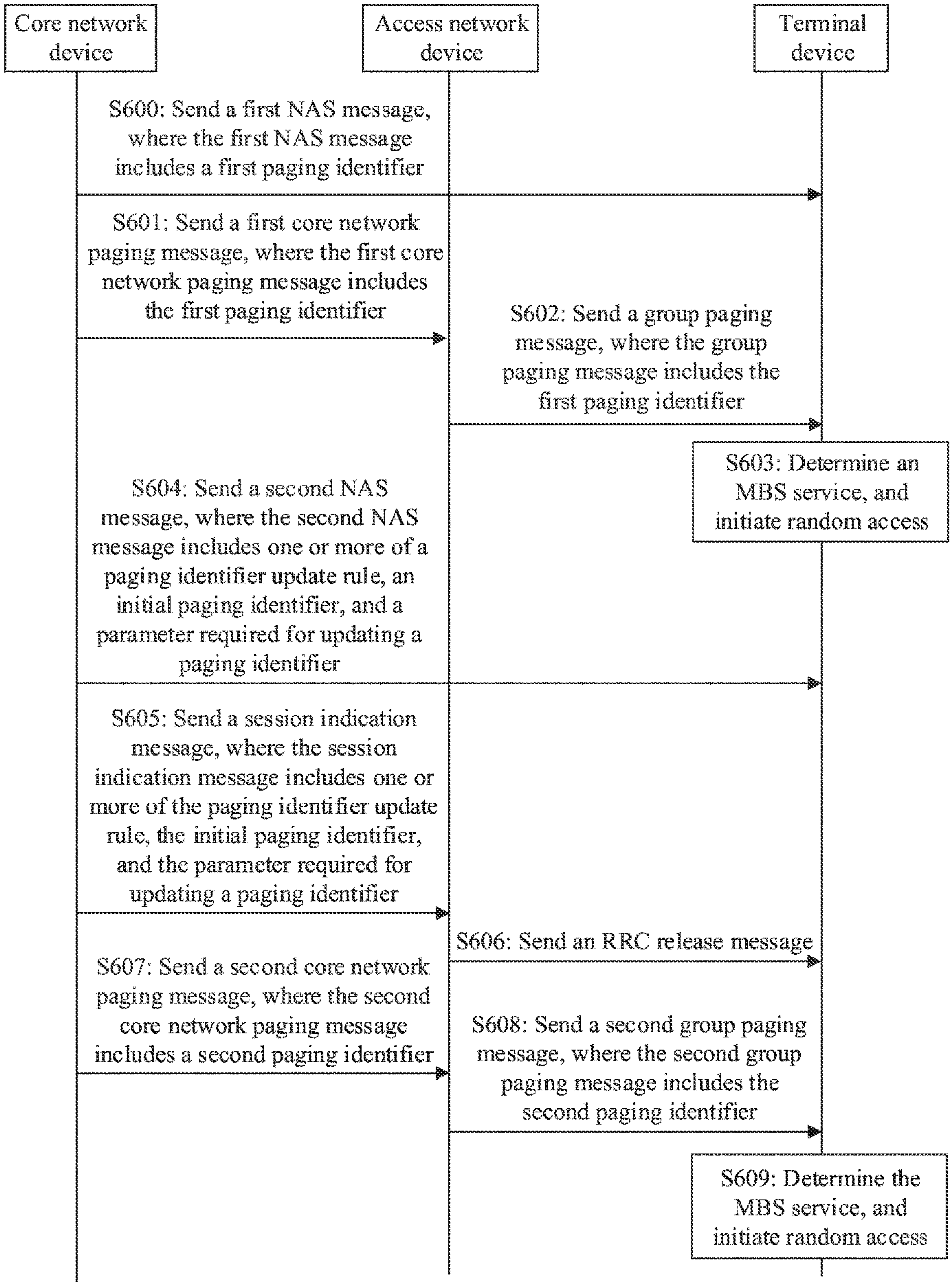
FIG. 6 is a schematic flowchart of another update processing-based MBS service paging method according to an embodiment of this application.

In Embodiment 5, when performing second paging for an MBS service on a terminal device, an access network device uses a paging identifier obtained by updating an initial paging identifier, and the terminal device correspondingly updates the initial paging identifier, to determine whether the service that the second paging is specific to is a service that the terminal device is interested in. The access network device and the terminal device obtain the paging identifier in the second paging by using same update information. The update information includes but is not limited to one or more of a paging identifier update rule, the initial paging identifier, and a parameter required for updating a paging identifier. One or more of the paging identifier update rule, the initial paging identifier, and the parameter required for updating a paging identifier may be separately sent by a core network device to the terminal device and the access network device before the second paging is initiated. The second paging is next paging of first paging. FIG. 6 is a schematic flowchart of another update processing-based MBS service paging method according to an embodiment of this application. The method may be applied to the communication system in FIG. 1*a*. The method includes the following steps S600 to S609.

Step S600: The core network device sends a first NAS message to the terminal device, where the first NAS message includes a first paging identifier.

Specifically, when the terminal device joins a service group of an MBS service, the core network device sends the NAS message to the terminal device. The NAS message includes the first paging identifier. The first paging identifier may be an MBS session identifier, a TMGI, or an IP multicast address, and the first paging identifier is used to identify the MBS service during first paging on the terminal device. In this way, before the first paging is initiated, the terminal device learns of an identifier to be used during the first paging. Therefore, when the access network device performs the first paging for the MBS service, the terminal device can determine, based on the first paging identifier, that the service is the MBS service. For example, the first paging identifier in this embodiment may be "MBS service 1".

Step S601: The core network device sends a first core network paging message to the access network device, where the first core network paging message includes the first paging identifier.

Specifically, the first paging identifier is used to identify the MBS service during the first paging. The first core network paging message indicates the access network device to initiate the first paging for the MBS service. It may be understood that the first core network paging message may further include one or more terminal device IDs and DRX parameters. Details are not described herein.

Step S602: The access network device sends a group paging message to the terminal device, where the group paging message includes the first paging identifier.

Specifically, the first group paging message carries the first paging identifier, and the first group paging message is used to perform the first paging on the terminal device for the MBS service.

Step S603: The terminal device determines the MBS service based on the first paging identifier, and in response to the first paging, enters a connected mode to receive the MBS service.

Specifically, after receiving the first group paging message, the terminal device determines, based on the first paging identifier "MBS service 1", that the service is the MBS service. The terminal device has joined the service group of the MBS service, and is interested in the MBS service, and therefore initiates random access and enters the connected mode. After receiving configuration information sent by the access network device, the terminal device starts to receive data of the MBS service.

Step S604: The core network device sends a second NAS message to the terminal device, where the second NAS message includes one or more of a paging identifier update rule, an initial paging identifier, and a parameter required for updating a paging identifier.

Specifically, before the access network device initiates second paging to the terminal device for the MBS service, the core network device first sends one or more of the paging identifier update rule, the initial paging identifier, and the parameter required for updating a paging identifier to the terminal device by using the NAS message. The parameter required for updating a paging identifier may be a quantity of updates to be made based on the initial paging identifier or the first paging identifier, and the parameter increases with a quantity of paging times. For example, next paging based on the first paging is the second paging for the MBS service, and the parameter required for updating a paging identifier may be "1". Then, the terminal device may update, once by using the paging identifier update rule, the first paging identifier "MBS service 1" used during the first paging, to obtain a second paging identifier "MBS service 2". Then, the terminal device monitors the second paging for the MBS service by using the second paging identifier. To be specific, an identifier used by the access network device to initiate the second paging for the MBS service is the second paging identifier.

Step S605: The core network device sends a session indication message to the access network device, where the session indication message includes one or more of the paging identifier update rule, the initial paging identifier, and the parameter required for updating a paging identifier.

Specifically, the session indication message indicates the access network device to suspend, stop, activate, or release a session of the MBS service, and can be used to send one or more of the paging identifier update rule, the initial paging identifier, and the parameter required for updating a paging identifier to the access network device in advance before the second paging is performed. Therefore, the access network device may determine, in advance, the second paging identifier "MBS service 2" to be used during the second paging on the terminal device for the MBS service, and a core network paging message used by the core network device to indicate the access network device to initiate the second paging also carries the second paging identifier "MBS service 2".

Optionally, the core network may send one or more of the paging identifier update rule, the initial paging identifier, and the parameter required for updating a paging identifier to the access network device by using another message.

Step S606: The access network device sends an RRC release message to the terminal device.

Specifically, the RRC release message is used to release the terminal device to an idle mode or an inactive mode.

Step S607: The core network device sends a third message to the access network device, where the third message includes the second paging identifier.

Specifically, the third message may be a second core network paging message, and indicates the access network device to initiate the second paging for the MBS service. An identifier used for the second paging is the second paging identifier. It may be understood that the second core network paging message may further include one or more terminal device IDs and DRX parameters. Details are not described herein.

Step S608: The access network device sends a fourth message to the terminal device, where the fourth message includes the second paging identifier.

Specifically, the fourth message may be a second group paging message, and is used to perform the second paging for the MBS service on the terminal device. An identifier used for the second paging performed for the MBS service is the second paging identifier "MBS service 2".

Step S609: The terminal device determines the MBS service based on the second paging identifier, and in response to the second paging, enters the connected mode to receive the MBS service.

Specifically, the terminal device determines, in step S604, the second paging identifier "MBS service 2" to be used for the second paging. Therefore, when receiving the second group paging message from the access network device, the terminal device can determine, based on the second paging identifier "MBS service 2", that a service that the group paging is specific to is the MBS service. After determining that the service is a service that the terminal device is interested in, the terminal device may initiate random access, enter the connected mode, and start to receive data of the MBS service after receiving the configuration information sent by the access network device.

Based on the foregoing method, before paging is started, the core network device, the access network device, and the terminal device only need to exchange, by using signaling, a latest parameter required for updating a paging identifier, to determine, in advance, an identifier to be used for the paging. Therefore, even if receiving of a service is missed before the paging, the identifier to be used for the paging may be determined based on the initial paging identifier or the first paging identifier and the latest parameter required for updating a paging identifier. Therefore, a different identifier is used for each time of paging performed for the MBS service. In this way, difficulty of tracking the service by an eavesdropper is increased, to improve security of the MBS service.

Figure 7A:
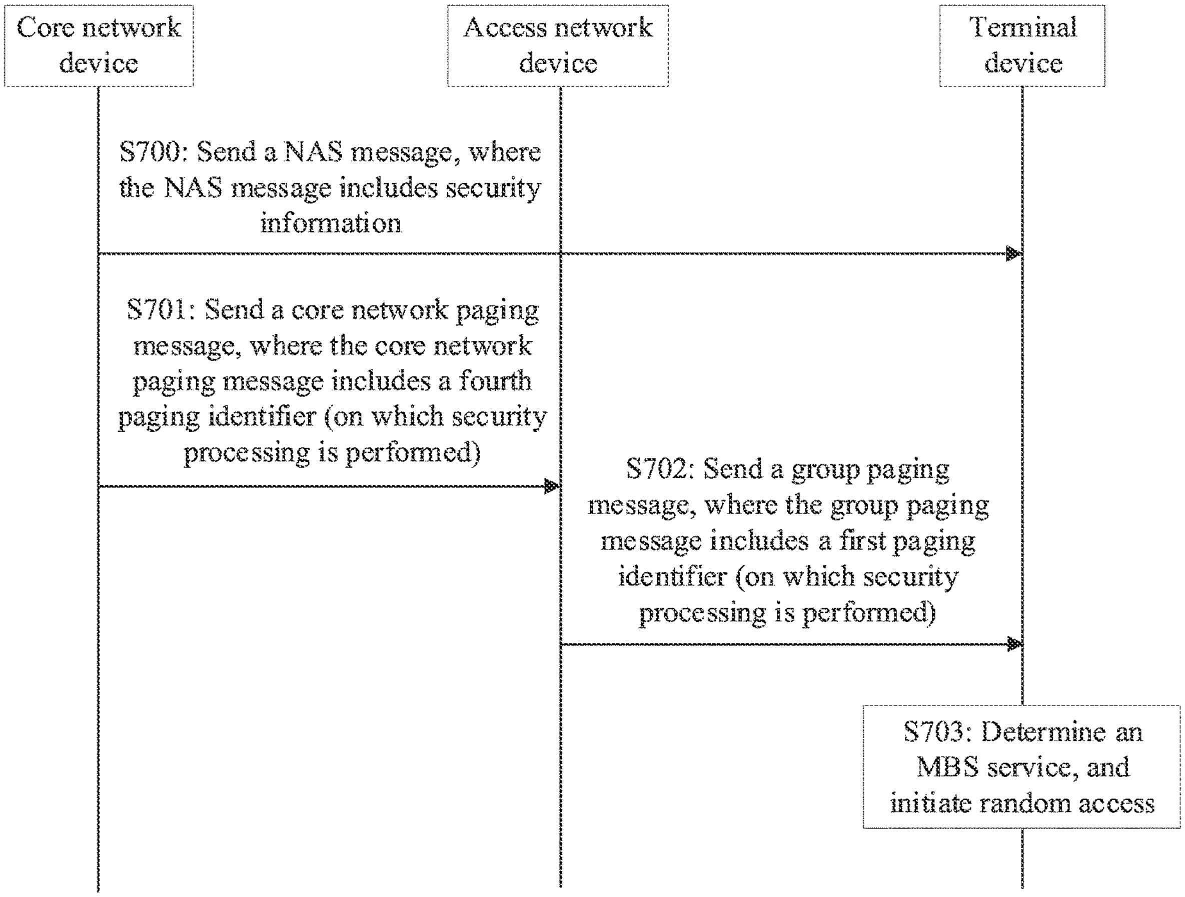
FIG. 7*a* is a schematic flowchart of a security processing-based MBS service paging method according to an embodiment of this application.
Figure 7B:
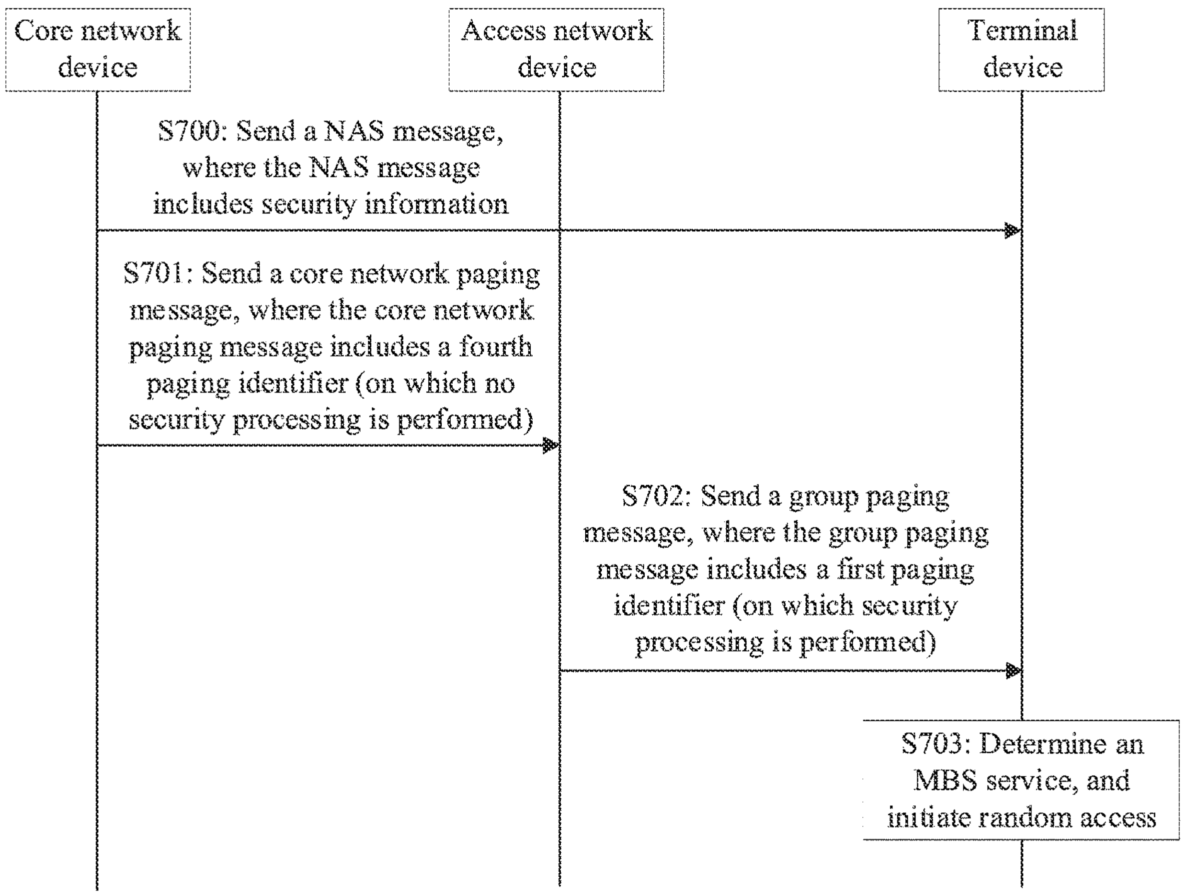
FIG. 7*b* is a schematic flowchart of another security processing-based MBS service paging method according to an embodiment of this application.

In Embodiment 6, when sending group paging for an MBS service to a terminal device, an access network device uses an identifier on which security processing is performed. One or more of a key, a security input parameter, and a security algorithm to be used for security processing may be separately sent by a core network device to the access network device and the terminal device before paging is initiated. FIG. 7*a* is a schematic flowchart of a security processing-based MBS service paging method according to an embodiment of this application, and FIG. 7*b* is a schematic flowchart of another security processing-based MBS service paging method according to an embodiment of this application. The method may be applied to the communication system in FIG. 1*a*. The method includes the following steps S700 to S703.

Step S700: The core network device sends a NAS message to the terminal device, where the NAS message includes security information, and the security information includes one or more of a key, a security input parameter, and a security algorithm.

Specifically, before second paging is initiated to the terminal device for an MBS service, the core network device sends the NAS message to the terminal device. The NAS message includes the security information, and the security information includes one or more of the key, the security input parameter, and the security algorithm. The security algorithm may be a symmetric encryption algorithm or an asymmetric encryption algorithm, for example, a DES algorithm, a 3DES algorithm, or an RSA algorithm.

Optionally, the access network device may send an RRC message to the terminal device. The RRC message includes the security information including one or more of the key, the security input parameter, and the security algorithm.

Optionally, the security information may be specified in a protocol in advance.

Step S701: The core network device sends a core network paging message to the access network device, where the core network paging message includes a fourth paging identifier.

Specifically, the fourth paging identifier is used to identify the MBS service. The core network paging message indicates the access network device to initiate the second paging for the MBS service. The fourth paging identifier may be an MBS session identifier, a TMGI, or an IP multicast address (to be specific, no security processing is performed on the fourth paging identifier in the message sent by the core network, as shown in S701 in FIG. 7*b*), or may be an identifier obtained by performing security processing on an MBS session identifier, a TMGI, or an IP multicast address (to be specific, security processing is performed on the fourth paging identifier in the message sent by the core network, as shown in S701 in FIG. 7*a*).

Optionally, the fourth paging identifier may be obtained by performing mapping processing on an MBS session identifier, a TMGI, or an IP multicast address (to be specific, no security processing is performed on the fourth paging identifier in the message sent by the core network, as shown in S701 in FIG. 7*b*), or may be an identifier obtained by performing mapping processing and security processing on an MBS session identifier, a TMGI, or an IP multicast address (to be specific, security processing is performed on the fourth paging identifier in the message sent by the core network, as shown in S701 in FIG. 7*a*).

Step S702: The access network device sends a group paging message to the terminal device, where the group paging message includes a first paging identifier.

Specifically, the first group paging message is used to perform the second paging on the terminal device for the MBS service.

It should be noted that the first paging identifier is obtained by performing security processing. If no security processing is performed on the fourth paging identifier in the core network paging message (as shown in S701 in FIG. 7*b*), the access network device may perform security processing on the fourth paging identifier by using the security information, to obtain the first paging identifier (as shown in S702 in FIG. 7*b*). If security processing is performed on the fourth paging identifier (as shown in S701 in FIG. 7*a*), the access network device may decrypt the fourth paging identifier based on the security information, to determine that the fourth paging identifier identifies the MBS service, and finally, set a new identifier based on the MBS service, and perform security processing to obtain the first paging identifier (as shown in S702 in FIG. 7*a*).

It should be further noted that the access network device may learn, in advance by using another message sent by the core network, of the security message to be used for security processing.

Step S703: The terminal device determines the MBS service based on the first paging identifier, and in response to the first paging, enters a connected mode to receive the MBS service.

Specifically, after receiving a first message, the terminal device first decrypts the first paging identifier based on the security information, to determine that the first paging identifier identifies the MBS service. After determining that the service is a service that the terminal device is interested in, the terminal device may initiate random access, enter the connected mode, and start to receive data of the MBS service after receiving configuration information sent by the access network device.

Based on the foregoing method, when paging is performed for the MBS service, the core network device, the access network device, and the terminal device perform service paging by using an identifier on which security processing is performed. Through security processing, language, text, and an image in a message can be hidden by using special symbols, and then paging is performed by using the hidden message. In this way, even if the message is stolen or intercepted in a paging process, a stealer cannot learn of content of the message, to ensure security of an identifier. Therefore, security processing is performed on an identifier used for each time of paging performed for the MBS service. In this way, difficulty of tracking the service by an eavesdropper can be increased, to improve security of the MBS service.

It should be noted that all multicast and broadcast services may share a group of security information, and each multicast and broadcast service may use different security information. This is not specifically limited herein.

It should be noted that complexity of system processing is increased when a process of performing security processing on the paging identifier is performed. Therefore, security processing on the paging identifier may not need to be performed for all the multicast and broadcast services. For example, for a service (for example, a video live streaming service) with a low security requirement, only normal paging may be used (to be specific, no security processing needs to be performed on a paging identifier); or for a service (for example, a public safety service) with a high security requirement, paging may be performed by using a paging identifier on which security processing is performed.

It should be further noted that whether security processing needs to be performed on the paging identifier may be determined by the core network device or the access network device. When the terminal device joins a multicast and broadcast service group, the core network device may indicate information about whether security processing is to be performed on a paging identifier in group paging for a multicast and broadcast service to the terminal device by using a NAS message; and if security processing needs to be performed, may further send security information corresponding to the multicast and broadcast service to the terminal device by using a NAS message; or if no security processing needs to be performed, may not send security information corresponding to the service. In addition, the core network device may indicate, in a paging message, information about whether the access network device needs to perform security processing on the paging identifier. Correspondingly, the access network device may use a broadcast message or a group paging message to carry indication information. The indication information indicates information about whether security processing is performed on the paging identifier in the paging to the terminal device.

Figure 8:
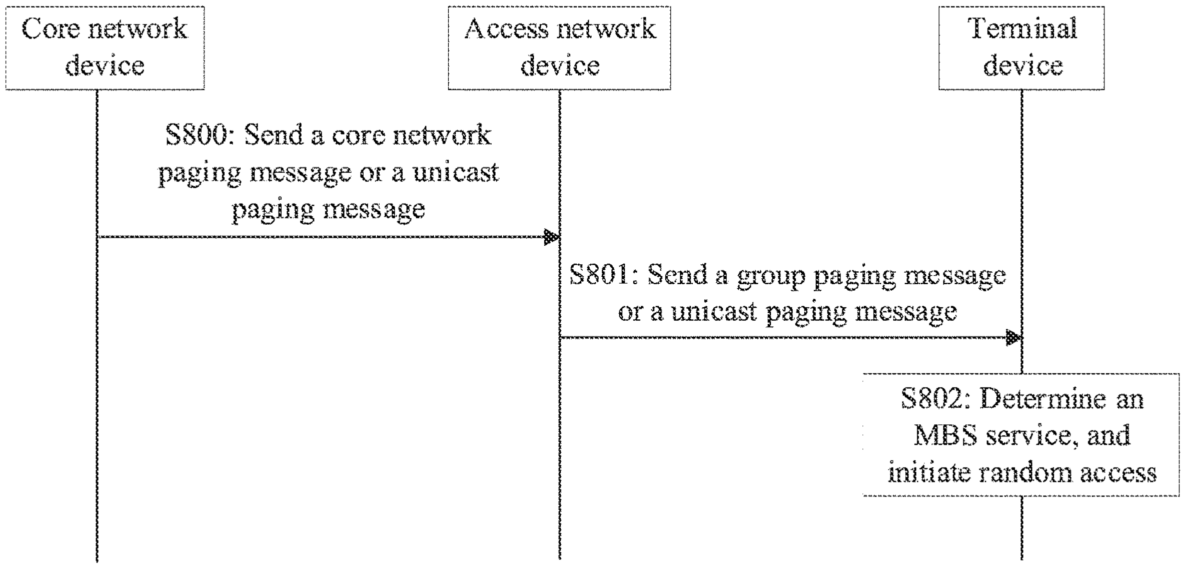
FIG. 8 is a schematic flowchart of a method for performing re-paging after an access failure of a terminal device according to an embodiment of this application.

In Embodiment 7, when a terminal device does not receive group paging for an MBS service, a core network device needs to start a protection mechanism, to ensure that all terminal devices interested in the MBS service can normally enter a connected mode to receive service data. An implementation of the protection mechanism is as follows: The core network device re-initiates group paging for the service, so that a terminal device that does not receive the current group paging or encounters a receiving error enters, by using the re-initiated group paging, a connected mode to receive the MBS service. Another implementation of the protection mechanism is as follows: The core network device separately initiates unicast paging to terminal devices that do not receive the current group paging or encounter a receiving error, so that the terminal devices enter a connected mode to receive a multicast service. FIG. 8 is a schematic flowchart of a method for performing re-paging after an access failure of a terminal device according to an embodiment of this application. The method may be applied to the communication system in FIG. 1*a*. The method includes the following steps S800 to S802.

S800: When the terminal device does not receive group paging for an MBS service, the core network device sends a core network paging message again.

Specifically, it is assumed that for some reasons, some terminal devices miss the group paging and do not enter a connected mode to access the MBS service. If the identifier update manner in the foregoing embodiment is used, these terminal devices may still store an identifier existing before an update because the connected mode is not entered, and another terminal device that receives the group paging and enters a connected mode may store an updated identifier. When an access network device performs paging for the MBS service by using the updated paging identifier next time, the terminal device that stores the identifier existing before an update does not enter the connected mode because of a mismatch of the paging identifier. Consequently, the terminal device cannot receive the MBS service. Therefore, when the terminal device does not receive the group paging for the MBS service, the core network device sends the core network paging message again to indicate the access network device to re-initiate paging for the MBS service to the terminal device. For a specific process, refer to the foregoing embodiment. Details are not described herein.

It should be noted that the core network device may alternatively roll back to a conventional unicast manner, and separately initiate unicast paging to terminal devices that do not receive the current group paging or encounter a receiving error, so that the terminal devices enter a connected mode to receive a multicast service.

Optionally, the core network device may first determine a quantity of terminal devices that do not receive the current group paging. If the quantity is less than a preset threshold, for example, the quantity is less than 5, the core network device rolls back to the conventional unicast manner, and separately initiates unicast paging to all terminal devices. Otherwise, the core network device may continue to send a core network paging message again in a group paging manner to indicate the access network device to page all terminal devices. The threshold is set, so that network overheads caused by still using the conventional unicast manner when there are a large quantity of terminals that do not receive the current group paging can be reduced.

S801: The access network device sends a group paging message.

Specifically, after receiving the core network paging message sent by the core network device, the access network device re-initiates paging for the MBS service to the terminal device by using the group paging message. For a specific process, refer to the foregoing embodiment. Details are not described herein.

It should be noted that the access network device may also correspondingly roll back to the conventional unicast manner, and separately initiate unicast paging to the terminal devices that do not receive the current group paging or encounter a receiving error, so that the terminal devices enter the connected mode to receive a multicast service.

S802: The terminal device determines the MBS service, and enters a connected mode to receive the MBS service.

Specifically, the terminal device may determine, based on an identifier carried in the group paging message or a unicast paging message, that the current paging is specific to the MBS service. After determining that the service is a service that the terminal device is interested in, the terminal device may initiate random access, enter the connected mode, and start to receive data of the MBS service after receiving configuration information sent by the access network device.

It should be noted that before accessing a multicast and broadcast service for the first time, the terminal device needs to first notify, by using a NAS procedure message, the core network device that the terminal device joins a group of the multicast and broadcast service. In this way, when subsequently initiating the multicast and broadcast service, the core network device can learn that the terminal device needs to be notified to enter the connected mode and receive the multicast and broadcast service, and may further learn of a terminal device that does not receive group paging or encounters a receiving error.

It should be further noted that the terminal device joins the multicast and broadcast group corresponding to the multicast and broadcast service by using a NAS procedure message. If the multicast and broadcast service is already in a transmission process in this case, the terminal device remains in the connected mode, the access network device sends configuration information for accessing the multicast and broadcast service to the terminal device, and the terminal device may access the multicast and broadcast service based on the configuration information. If transmission of the multicast and broadcast service is stopped or is not started, the access network device may send an RRC release message to the terminal device, to release the terminal device to an idle mode or an inactive mode. The RRC release message may indicate a paging identifier for the multicast and broadcast service, and the terminal device may determine, based on the paging identifier, a time at which the multicast and broadcast service is started.

Finally, it should be further noted that update processing and security processing in Embodiments 1 to 7 may be combined. If security processing is further performed on the updated identifier, difficulty of tracking the service by the eavesdropper can be increased to a greater extent, to more significantly improve security of the MBS service.

It may be understood that when Embodiments 1 to 7 are applied to an MBS service, because an identifier of the MBS service is processed by using one or more of update processing and security processing, an identifier used for each time of paging for the MBS service is different from an identifier used for previous paging, or security processing is performed on an identifier used for each time of paging. Therefore, it is very difficult for the eavesdropper to track the service by using the identifier of the MBS service. In this application, difficulty of tracking the MBS service by the eavesdropper is increased, to improve security of the MBS service.

The method in embodiments of this application is described above in detail. The following provides three related devices in embodiments of this application.

Figure 9:
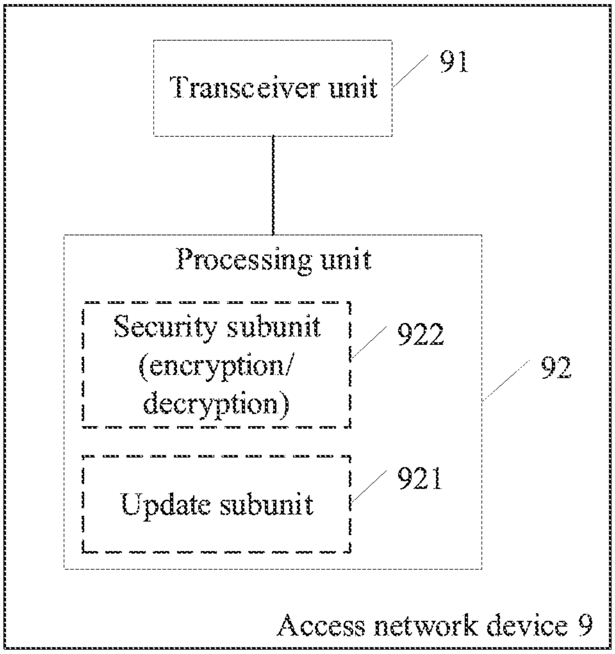
FIG. 9 is a schematic diagram of a structure of an access network device according to an embodiment of this application.

FIG. 9 is a schematic diagram of a structure of an access network device according to an embodiment of this application. The access network device 9 may include a transceiver unit 91 and a processing unit 92. Detailed descriptions of the units are as follows.

In a design, the transceiver unit 91 is configured to send a first message, where the first message includes a first paging identifier, the first message is used to perform first paging on a terminal device, and the first paging identifier is used to identify a first service; and the transceiver unit 91 is configured to send a second message, where the second message includes a second paging identifier, the second paging identifier is used to replace, during second paging, the first paging identifier to identify the first service, and the second paging is next paging of the first paging.

In a possible implementation, the second message is an RRC message or a NAS message.

In a possible implementation, the transceiver unit 91 is further configured to receive a third message sent by a core network device, where the third message includes a third paging identifier, the third paging identifier is used to identify the first service, the third message is a session indication message, and the session indication message indicates the access network device to suspend, stop, activate, or release a session of the first service.

In a possible implementation, the transceiver unit 91 is configured to receive a third message, where the third message is a core network paging message, and the core network paging message indicates the access network device to perform the second paging on the terminal device.

In a possible implementation, the third paging identifier is an MBS session identifier, a TMGI, or an IP multicast address.

In a possible implementation, the transceiver unit 91 is further configured to send a fourth message to the terminal device, where the fourth message includes the second paging identifier, and the fourth message is used to perform the second paging on the terminal device.

In a possible implementation, the third message includes a third paging identifier, and the third paging identifier is an identifier for which a mapping relationship with an MBS session identifier, a TMGI, or an IP multicast address is established.

In a possible implementation, when the terminal device does not receive group paging for the first service, the transceiver unit 91 is further configured to receive a core network paging message or a unicast paging message sent by the core network device, where the core network paging message or the unicast paging message indicates the access network device to re-initiate paging for the first service to the terminal device; and the transceiver unit 91 sends a group paging message or a unicast paging message to the terminal device, where the group paging message or the unicast paging message is used to re-initiate paging for the first service to the terminal device.

In another design, the transceiver unit 91 is configured to receive a core network paging message sent by a core network device, where the core network paging message includes a first paging identifier and a second paging identifier, the first paging message is used to identify a first service during first paging, the second paging identifier is used to identify the first service during second paging, and the core network paging message indicates the access network device to initiate the first paging for the first service to a terminal device; the transceiver unit 91 sends a first message, where the first message includes the first paging identifier, and the first message may be a first group paging message, and is used to perform the first paging on the terminal device for the MBS service; and the transceiver unit 91 sends a second message, where the second message includes the second paging identifier.

In a possible implementation, when the terminal device does not receive group paging for the first service, the transceiver unit 91 is further configured to receive a core network paging message or a unicast paging message sent by the core network device, where the core network paging message or the unicast paging message indicates the access network device to re-initiate paging for the first service to the terminal device; and the transceiver unit 91 sends a group paging message or a unicast paging message to the terminal device, where the group paging message or the unicast paging message is used to re-initiate paging for the first service to the terminal device.

In another design, the transceiver unit 91 is configured to receive a NAS message or a session indication message sent by a core network device, where the NAS message or the session indication message includes one or more of a paging identifier update rule, an initial paging identifier, and a parameter required for updating a paging identifier; the transceiver unit 91 forwards the NAS message or sends an RRC release message to a terminal device, where the RRC release message is a message corresponding to the session indication message, and carries one or more of the paging identifier update rule, the initial paging identifier, and the parameter required for updating a paging identifier, and the parameter required for updating a paging identifier may be a quantity of updates to be made based on the initial paging identifier or a first paging identifier according to the paging identifier update rule; and the access network device further includes the processing unit 92, configured to suspend, stop, activate, or release a session of the first service based on the session indication message.

Optionally, the processing unit 92 further includes an update subunit 921, configured to make a specific quantity of updates based on the initial paging identifier or the first paging identifier according to the update rule, to determine an identifier to be used for next paging.

In a possible implementation, when the terminal device does not receive group paging for the first service, the transceiver unit 91 is further configured to receive a core network paging message or a unicast paging message sent by the core network device, where the core network paging message or the unicast paging message indicates the access network device to re-initiate paging for the first service to the terminal device; and the transceiver unit 91 sends a group paging message or a unicast paging message to the terminal device, where the group paging message or the unicast paging message is used to re-initiate paging for the first service to the terminal device.

In another design, the transceiver unit 91 is configured to receive a core network paging message sent by a core network device, where the core network paging message includes a fourth paging identifier, the core network paging message indicates the access network device to initiate paging to a terminal device for a first service, and the fourth paging identifier may be obtained by performing security processing on an MBS session identifier, a TMGI, an IP multicast address, or a mapping identifier of an MBS session identifier, a temporary mobile group identity TMGI, or an IP multicast address;

the access network device further includes the processing unit 92, configured to set a first paging identifier based on the fourth paging identifier, where security processing is also performed on the first paging identifier; and the transceiver unit 91 sends a group paging message, where the group paging message includes the first paging identifier, the group paging message is used to initiate paging to the terminal device, and the first paging identifier is used to identify the first service.

Optionally, the processing unit 92 further includes a security subunit (encryption/decryption) 922, configured to: decrypt the fourth paging identifier and encrypt the first paging identifier.

In a possible implementation, when the terminal device does not receive group paging for the first service, the transceiver unit 91 is further configured to receive a core network paging message or a unicast paging message sent by the core network device, where the core network paging message or the unicast paging message indicates the access network device to re-initiate paging for the first service to the terminal device; and the transceiver unit 91 sends a group paging message or a unicast paging message to the terminal device, where the group paging message or the unicast paging message is used to re-initiate paging for the first service to the terminal device.

Figure 10:
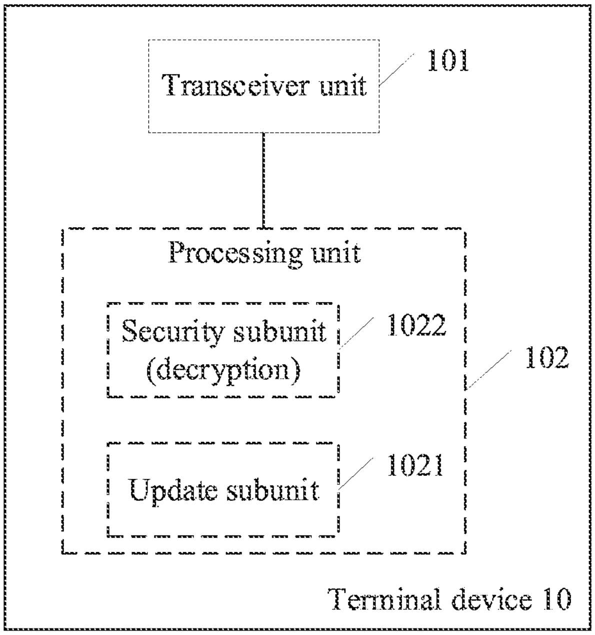
FIG. 10 is a schematic diagram of a structure of a terminal device according to an embodiment of this application.

FIG. 10 is a schematic diagram of a structure of a terminal device according to an embodiment of this application. The terminal device 10 may include a transceiver unit 101. Optionally, the terminal device 10 may further include a processing unit 102. Detailed descriptions of the units are as follows.

In a design, the transceiver unit 101 is configured to receive a first message sent by an access network device, where the first message includes a first paging identifier, the first message is used to perform first paging on the target terminal device, and the first paging identifier is used to identify a first service; and the transceiver unit 101 is configured to receive a second message sent by the access network device, where the second message includes a second paging identifier, the second paging identifier is used to replace, during second paging, the first paging identifier to identify the first service, and the second paging is next paging of the first paging.

In a possible implementation, the second message is an RRC message or a NAS message.

In a possible implementation, the transceiver unit 101 is further configured to receive a fourth message sent by the access network device, where the fourth message includes the second paging identifier, and the fourth message is used to perform the second paging on the terminal device.

Optionally, the terminal device further includes the processing unit 102, configured to: determine the first service and initiate random access to the first service.

In a possible implementation, when the terminal device joins a service group of the first service, the transceiver unit 101 is further configured to receive a NAS message sent by a core network device, where the NAS message includes the first paging identifier.

In a possible implementation, the first paging identifier and the second paging identifier each are an MBS session identifier, a TMGI, or an IP multicast address, or the first paging identifier and the second paging identifier each are an identifier for which a mapping relationship with an MBS session identifier, a TMGI, or an IP multicast address is established.

In a possible implementation, when the terminal device does not receive group paging for the first service, the transceiver unit 101 receives a group paging message or a unicast paging message sent by the access network device, where the group paging message or the unicast paging message is used to re-initiate paging for the first service to the terminal device.

In another design, the transceiver unit 101 is configured to receive a NAS message sent by a core network device or an RRC message sent by an access network device, where the NAS message or the RRC message includes one or more of a paging identifier update rule, an initial paging identifier, and a parameter required for updating a paging identifier, and the parameter required for updating a paging identifier may be a quantity of updates to be made based on the initial paging identifier or a first paging identifier according to the update rule; and the transceiver unit 101 receives a fourth message sent by the access network device, where the fourth message includes a second paging identifier, the second paging identifier is used to identify a first service, and the fourth message is used to initiate second paging to the terminal device for the service.

Optionally, the terminal device further includes the processing unit 102, configured to release a link resource of the current paging in response to the RRC message.

Optionally, the processing unit 102 further includes an update subunit 1021, configured to make a specific quantity of updates based on the initial paging identifier or the first paging identifier according to the update rule, to determine an identifier to be used for the second paging.

In a possible implementation, when the terminal device does not receive group paging for the first service, the transceiver unit 101 receives a group paging message or a unicast paging message sent by the access network device, where the group paging message or the unicast paging message is used to re-initiate paging for the first service to the terminal device.

In another design, the transceiver unit 101 is configured to receive a group paging message sent by an access network device, where the group paging message includes a first paging identifier, the group paging message is used to initiate paging for a first service to the terminal device, the first paging identifier may be obtained by performing security processing on an MBS session identifier, a TMGI, or an IP multicast address, and the first paging identifier is used to identify the first service.

Optionally, the terminal device further includes the processing unit 102, configured to: determine the first service and initiate random access to the current service paging.

Optionally, the processing unit 102 further includes a security subunit (decryption) 1022, configured to decrypt the first paging identifier.

In a possible implementation, when the terminal device does not receive group paging for the first service, the transceiver unit 101 receives a group paging message or a unicast paging message sent by the access network device, where the group paging message or the unicast paging message is used to re-initiate paging for the first service to the terminal device.

Figure 11:
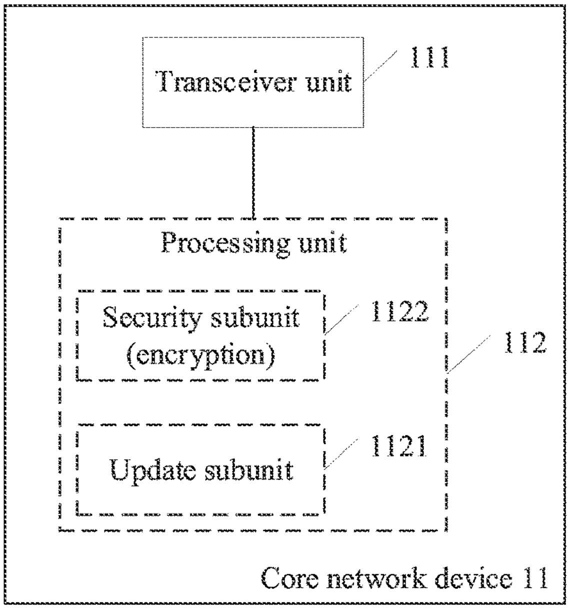
FIG. 11 is a schematic diagram of a structure of a core network device according to an embodiment of this application.

FIG. 11 is a schematic diagram of a structure of a core network device according to an embodiment of this application. The core network device 11 may include a transceiver unit 111. Optionally, the core network device 11 may further include a processing unit 112. Detailed descriptions of the units are as follows.

In a design, the transceiver unit 111 is configured to send a third message to an access network device, where the third message includes a third paging identifier, the third paging identifier is used to replace, during second paging, a first paging identifier to identify a first service, the first paging identifier is used to identify the first service during first paging, and the second paging is next paging of the first paging.

In a possible implementation, the third message is a session indication message or a NAS message, and the session indication message indicates the access network device to stop, activate, or release a session of the first service.

In a possible implementation, the third message is a core network paging message, the core network paging message indicates the access network device to perform the second paging on a terminal device, and the second paging is the next paging of the first paging.

In a possible implementation, the third paging identifier is an MBS session identifier, a TMGI, or an IP multicast address.

In a possible implementation, when the terminal device joins a service group of the first service, the transceiver unit 111 sends a NAS message to the terminal device, where the NAS message includes the first paging identifier, and the first paging identifier is used to identify the first service during the first paging on the terminal device.

In a possible implementation, the third paging identifier is an identifier for which a mapping relationship with an MBS session identifier, a TMGI, or an IP multicast address is established.

In a possible implementation, when the terminal device does not receive group paging for the first service, the transceiver unit 111 sends a core network paging message or a unicast paging message, where the core network paging message or the unicast paging message indicates the access network device to re-initiate paging for the first service to the terminal device.

In another design, the transceiver unit 111 sends a core network paging message, where the core network paging message includes a first paging identifier and a second paging identifier, the first paging message is used to identify a first service during first paging, the second paging identifier is used to identify the first service during second paging, and the core network paging message indicates an access network device to initiate the first paging for the first service.

In a possible implementation, when a terminal device does not receive group paging for the first service, the transceiver unit 111 sends a core network paging message or a unicast paging message, where the core network paging message or the unicast paging message indicates the access network device to re-initiate paging for the first service to the terminal device.

In another design, the transceiver unit 111 sends a NAS message or a session indication message, where the NAS message or the session indication message includes one or more of a paging identifier update rule, an initial paging identifier, and a parameter required for updating a paging identifier, and the parameter required for updating a paging identifier may be a quantity of updates to be made based on the initial paging identifier or a first paging identifier according to the paging identifier update rule; and the transceiver unit 111 sends a core network paging message to an access network device, where the core network paging message includes a second paging identifier, the second paging identifier is used to identify a first service, and the core network paging message indicates the access network device to initiate second paging to a terminal device for the service.

Optionally, the core network device further includes the processing unit 112, configured to generate the NAS message or the session indication message.

Optionally, the processing unit 112 further includes an update subunit 1121, configured to make a specific quantity of updates based on the initial paging identifier or the first paging identifier according to the update rule, to determine an identifier to be used for the second paging.

In a possible implementation, when the terminal device does not receive group paging for the first service, the transceiver unit 111 sends a core network paging message or a unicast paging message, where the core network paging message or the unicast paging message indicates the access network device to re-initiate paging for the first service to the terminal device.

In another design, the transceiver unit 111 sends a core network paging message, where the core network paging message includes a fourth paging identifier, the core network paging message indicates an access network device to initiate paging to a terminal device for a first service, and the fourth paging identifier may be obtained by performing security processing on an MBS session identifier, a TMGI, an IP multicast address, or a mapping identifier of an MBS session identifier, a TMGI, or an IP multicast address.

Optionally, the core network device further includes the processing unit 112, configured to generate the core network paging message.

Optionally, the processing unit 112 further includes a security subunit (encryption) 1122, configured to encrypt the fourth paging identifier.

In a possible implementation, when the terminal device does not receive group paging for the first service, the transceiver unit 111 sends a core network paging message or a unicast paging message, where the core network paging message or the unicast paging message indicates the access network device to re-initiate paging for the first service to the terminal device.

It should be noted that for functions of the functional units in the core network device 11, the access network device 9, and the terminal device 10 described in embodiments of this application, refer to related descriptions in the foregoing method embodiments. Details are not described herein.

In a possible product form, the core network device, the access network device, or the terminal device in embodiments of this application may be implemented by using a general bus architecture.

Figure 12:
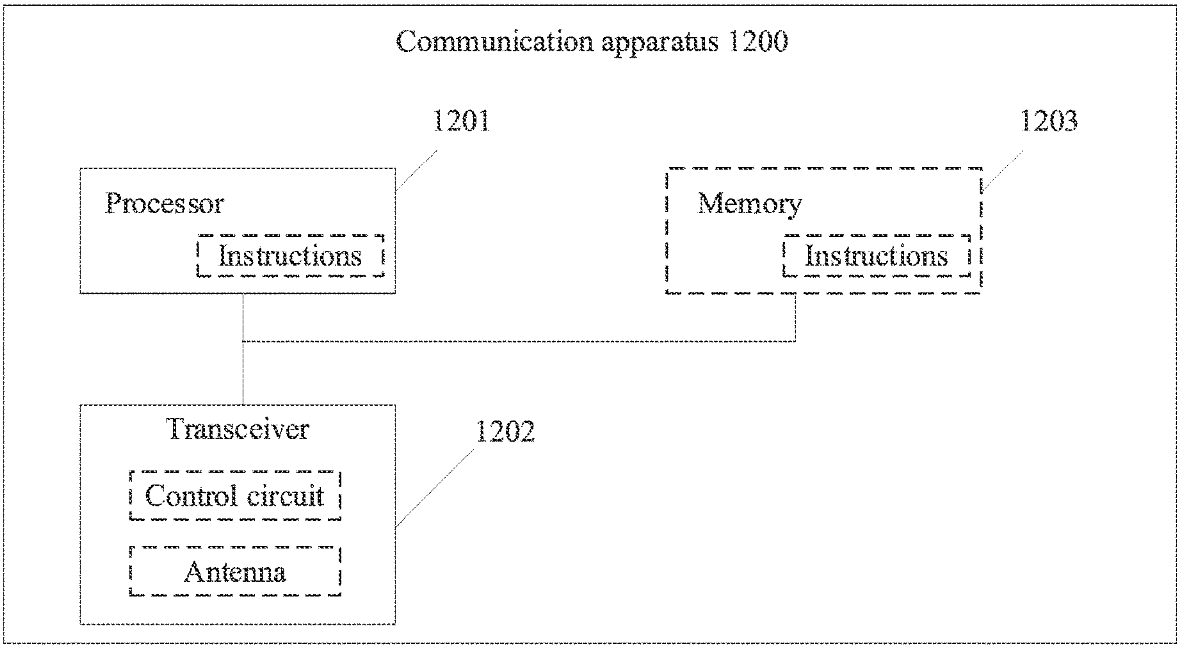
FIG. 12 is a schematic diagram of a structure of a communication apparatus 1200 according to an embodiment of this application.

For ease of description, FIG. 12 is a schematic diagram of a structure of a communication apparatus 1200 according to an embodiment of this application. The communication apparatus 1200 may be a core network device, an access network device, a terminal device, or a chip in a core network device, an access network device, or a terminal device. FIG. 12 shows only main components of the communication apparatus 1200. In addition to a processor 1201 and a transceiver 1202, the communication apparatus may further include a memory 1203 and an input/output apparatus (not shown in the figure).

The processor 1201 is mainly configured to: process a communication protocol and communication data, control the entire communication apparatus, execute a software program, and process data of the software program. The memory 1203 is mainly configured to store the software program and the data. The transceiver 1202 may include a control circuit and an antenna. The control circuit is mainly configured to: perform conversion between a baseband signal and a radio frequency signal, and process the radio frequency signal. The antenna is mainly configured to receive and send a radio frequency signal in a form of an electromagnetic wave. The input/output apparatus such as a touchscreen, a display, or a keyboard is mainly configured to: receive data entered by a user, and output data to the user.

After the communication apparatus is powered on, the processor 1201 may read the software program in the memory 1203, interpret and execute instructions of the software program, and process data of the software program. When data needs to be wirelessly sent, the processor 1201 performs baseband processing on the to-be-sent data, and then outputs a baseband signal to a radio frequency circuit, and the radio frequency circuit performs radio frequency processing on the baseband signal, and then sends a radio frequency signal to outside in a form of an electromagnetic wave through an antenna. When data is to be sent to the communication apparatus, the radio frequency circuit receives a radio frequency signal through the antenna, converts the radio frequency signal into a baseband signal, and outputs the baseband signal to the processor 1201, and the processor 1201 converts the baseband signal into data, and processes the data.

In another implementation, the radio frequency circuit and the antenna may be disposed independent of the processor that performs baseband processing. For example, in a distributed scenario, the radio frequency circuit and the antenna may be disposed remotely and independent of the communication apparatus.

The processor 1201, the transceiver 1202, and the memory 1203 may be connected through a communication bus.

In a design, the communication apparatus 1200 may be configured to perform a service paging function in Embodiment 1; the processor 1201 may be configured to generate various messages sent in steps in FIG. 3*a*, and/or configured to perform another process of the technology described in this specification; and the transceiver 1202 may be configured to receive and send messages in steps in FIG. 3*a*, and/or configured to perform another process of the technology described in this specification.

In another design, the communication apparatus 1200 may be configured to perform a service function in Embodiment 2; the processor 1201 may be configured to generate messages sent in steps in FIG. 3*b*, and/or configured to perform another process of the technology described in this specification; and the transceiver 1202 may be configured to receive and send messages in steps in FIG. 3*b*, and/or configured to perform another process of the technology described in this specification.

In another design, the communication apparatus 1200 may be configured to perform a service paging function in Embodiment 3; the processor 1201 may be configured to generate messages sent in steps in FIG. 4, and/or configured to perform another process of the technology described in this specification; and the transceiver 1202 may be configured to receive and send messages in steps in FIG. 4, and/or configured to perform another process of the technology described in this specification.

In another design, the communication apparatus 1200 may be configured to perform a service paging function in Embodiment 4; the processor 1201 may be configured to generate messages sent in steps in FIG. 5, and/or configured to perform another process of the technology described in this specification; and the transceiver 1202 may be configured to receive and send messages in steps in FIG. 5, and/or configured to perform another process of the technology described in this specification.

In another design, the communication apparatus 1200 may be configured to perform a service paging function in Embodiment 5; the processor 1201 may be configured to generate messages sent in steps in FIG. 6, and/or configured to perform another process of the technology described in this specification; and the transceiver 1202 may be configured to receive and send messages in steps in FIG. 6, and/or configured to perform another process of the technology described in this specification.

In another design, the communication apparatus 1200 may be configured to perform a service paging function in Embodiment 6; the processor 1201 may be configured to generate messages sent in steps in FIG. 7*a* or FIG. 7*b*, and/or configured to perform another process of the technology described in this specification; and the transceiver 1202 may be configured to receive and send messages in steps in FIG.

7*a* or FIG. 7*b*, and/or configured to perform another process of the technology described in this specification.

In another design, the communication apparatus 1200 may be configured to perform a service paging function in Embodiment 7; the processor 1201 may be configured to generate messages sent in steps in FIG. 8, and/or configured to perform another process of the technology described in this specification; and the transceiver 1202 may be configured to receive and send messages in steps in FIG. 8, and/or configured to perform another process of the technology described in this specification.

In any one of the foregoing designs, the processor 1201 may include a transceiver configured to implement receiving and sending functions. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In any one of the foregoing designs, the processor 1201 may store instructions. The instructions may be a computer program. The computer program runs on the processor 1201, to enable the communication apparatus 1200 to perform the method described in any one of the foregoing method embodiments. The computer program may be embedded in the processor 1201. In this case, the processor 1201 may be implemented by hardware.

In an implementation, the communication apparatus 1200 may include a circuit, and the circuit may implement a sending, receiving, or communication function in the foregoing method embodiments. The processor and the transceiver that are described in this application may be implemented on an integrated circuit (integrated circuit, IC), an analog IC, a radio frequency integrated circuit RFIC, a mixed-signal IC, an application-specific integrated circuit (application-specific integrated circuit, ASIC), a printed circuit board (printed circuit board, PCB), an electronic device, or the like. The processor and the transceiver may alternatively be manufactured by using various IC technologies, for example, a complementary metal oxide semiconductor (complementary metal oxide semiconductor, CMOS), an N-channel metal oxide semiconductor (nMetal-oxide-semiconductor, NMOS), a P-channel metal oxide semiconductor (positive-channel metal oxide semiconductor, PMOS), a bipolar junction transistor (bipolar junction transistor, BJT), a bipolar CMOS (BiCMOS), silicon germanium (SiGe), and gallium arsenide (GaAs).

A scope of the communication apparatus described in this application is not limited thereto, and a structure of the communication apparatus may not be limited by FIG. 12. The communication apparatus may be an independent device or may be a part of a large device. For example, the communication apparatus may be:

(1) an independent integrated circuit IC, a chip, a chip system, or a subsystem;
(2) a set including one or more ICs, where optionally, the set of ICs may further include a storage component configured to store data and a computer program;
(3) an ASIC such as a modem (Modem);
(4) a module that can be built into another device;
(5) a receiver, a terminal, an intelligent terminal, a cellular phone, a wireless device, a handheld device, a mobile unit, a vehicle-mounted device, a network device, a cloud device, an artificial intelligence device, or the like; or
(6) others.

In a possible product form, the core network device, the access network device, or the terminal device in embodiments of this application may be implemented by using a general-purpose processor.

A general-purpose processor for implementing service paging includes a processing circuit and an input/output interface that is internally connected to and communicates with the processing circuit.

In a design, the general-purpose processor may be configured to perform a service paging function in Embodiment 1; the processing circuit may be configured to generate various messages sent in steps in FIG. 3*a*, and/or configured to perform another process of the technology described in this specification; and the input/output interface may be configured to receive and send messages in steps in FIG. 3*a*, and/or configured to perform another process of the technology described in this specification.

In another design, the general-purpose processor may be configured to perform a service function in Embodiment 2; the processing circuit may be configured to generate messages sent in steps in FIG. 3*b*, and/or configured to perform another process of the technology described in this specification; and the input/output interface may be configured to receive and send messages in steps in FIG. 3*b*, and/or configured to perform another process of the technology described in this specification.

In another design, the general-purpose processor may be configured to perform a service paging function in Embodiment 3; the processing circuit may be configured to generate messages sent in steps in FIG. 4, and/or configured to perform another process of the technology described in this specification; and the input/output interface may be configured to receive and send messages in steps in FIG. 4, and/or configured to perform another process of the technology described in this specification.

In another design, the general-purpose processor may be configured to perform a service paging function in Embodiment 4; the processing circuit may be configured to generate messages sent in steps in FIG. 5, and/or configured to perform another process of the technology described in this specification; and the input/output interface may be configured to receive and send messages in steps in FIG. 5, and/or configured to perform another process of the technology described in this specification.

In another design, the general-purpose processor may be configured to perform a service paging function in Embodiment 5; the processing circuit may be configured to generate messages sent in steps in FIG. 6, and/or configured to perform another process of the technology described in this specification; and the input/output interface may be configured to receive and send messages in steps in FIG. 6, and/or configured to perform another process of the technology described in this specification.

In another design, the general-purpose processor may be configured to perform a service paging function in Embodiment 6; the processing circuit may be configured to generate messages sent in steps in FIG. 7*a* or FIG. 7*b*, and/or configured to perform another process of the technology described in this specification; and the input/output interface may be configured to receive and send messages in steps in FIG. 7*a* or FIG. 7*b*, and/or configured to perform another process of the technology described in this specification.

In another design, the general-purpose processor may be configured to perform a service paging function in Embodiment 7; the processing circuit may be configured to generate messages sent in steps in FIG. 8, and/or configured to perform another process of the technology described in this specification; and the input/output interface may be configured to receive and send messages in steps in FIG. 8, and/or configured to perform another process of the technology described in this specification.

It should be understood that the communication apparatuses in the foregoing various product forms have any service paging function in the foregoing method embodiments. Details are not described herein.

An embodiment of this application further provides a computer-readable storage medium. The computer-readable storage medium stores computer program code. When the foregoing processor executes the computer program code, an electronic device performs the method in any one of the foregoing embodiments.

An embodiment of this application further provides a computer program product. When the computer program product runs on a computer, the computer is enabled to perform the method in any one of the foregoing embodiments.

An embodiment of this application further provides a communication apparatus. The apparatus may exist in a product form of a chip. A structure of the apparatus includes a processor and an interface circuit. The processor is configured to communicate with another apparatus through the receiving circuit, to enable the apparatus to perform the method in any one of the foregoing embodiments.

An embodiment of this application further provides a wireless communication system, including one or more of a core network device, an access network device, and a terminal device, which may perform the method in any one of the foregoing embodiments.

In the foregoing embodiments, each embodiment is described by focusing on a different aspect. For a part that is not described in detail in an embodiment, refer to related descriptions in another embodiment.

It should be noted that for brief description, the foregoing method embodiments are represented as a series of actions. However, it should be appreciated by persons skilled in the art that this application is not limited to the described order of the actions, because according to this application, some steps may be performed in other orders or simultaneously. It should be further appreciated by persons skilled in the art that all of embodiments described in this specification are preferred embodiments, and the involved actions and modules are not necessarily required by this application.

In several embodiments provided in this application, it should be understood that the disclosed apparatuses may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form or another form.

The units described as separate parts may or may not be physically separate, and parts shown as units may or may not be physical units, may be located at one location, or may be distributed on a plurality of network units. Some or all of the units may be selected based on actual requirements to achieve the objectives of the solutions of embodiments of this application.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like, and may be specifically a processor in a computer device) to perform all or some of the steps of the methods in embodiments of this application. The foregoing storage medium may include any medium that can store program code, for example, a USB flash drive, a removable hard disk, a magnetic disk, an optical disc, a read-only memory (Read-Only Memory, ROM for short), or a random access memory (Random Access Memory, RAM for short).

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed is:

1. A service paging method, comprising:

sending a first message to a terminal device, wherein the first message comprises a first paging identifier used for identifying a first service, the first message is used to perform first paging on the terminal device;

receiving a third message sent by a core network device, wherein the third message comprises a third paging identifier identifying the first service;

determining a second paging identifier based on the third paging identifier; and sending a second message to the terminal device, wherein the second message comprises a second paging identifier, the second paging identifier is used to replace, during second paging, the first paging identifier to identify the first service, and the second paging is next paging of the first paging.

2. The method of claim 1, wherein the second message is a radio resource control (RRC) message or a non-access stratum (NAS) message.

3. The method of claim 1, wherein the third message is a core network paging message, and the core network paging message indicates to perform the second paging on the terminal device.

4. The method of claim 1, wherein the third message is a session indication message indicating to suspend, stop, activate, or release a session of the first service.

5. The method of claim 1, wherein the third paging identifier is a multicast and broadcast service (MBS) session identifier, a temporary mobile group identity (TMGI), or an internet protocol (IP) multicast address.

6. The method of claim 1, the method further comprising: sending a fourth message to the terminal device, wherein the fourth message comprises the second paging identifier, and the fourth message is used to perform the second paging on the terminal device.

7. A service paging method, comprising:
receiving a first message sent by an access network device, wherein the first message is used to perform first paging on a target terminal device and comprises a first paging identifier used to identify a first service, and the first paging identifier is a multicast and broadcast service (MBS) session identifier, a temporary mobile group identity (TMGI), or an internet protocol (IP) multicast address; and
receiving a second message sent by the access network device, wherein the second message comprises a second paging identifier, the second paging identifier is used to replace, during second paging, the first paging identifier to identify the first service, and the second paging is next paging of the first paging.

8. The method of claim 7, wherein the second message is a radio resource control (RRC) message or a non-access stratum (NAS) message.

9. The method of claim 7, the method further comprising: receiving a fourth message sent by the access network device, wherein the fourth message comprises the second paging identifier, and the fourth message is used to perform the second paging on a terminal device.

10. An apparatus, comprising:
a non-transitory memory configured to store program instructions; and
one or more processors configured to execute the program instructions to cause the apparatus to:
send a first message to a terminal device, wherein the first message comprises a first paging identifier used to identify a first service, the first message is used to perform first paging on the terminal device;
receive a third message sent by a core network device, wherein the third message comprises a third paging identifier identifying the first service; and
determine the second paging identifier based on the third paging identifier; and
send a second message to the terminal device, wherein the second message comprises a second paging identifier, the second paging identifier is used to replace, during second paging, the first paging identifier to identify the first service, and the second paging is next paging of the first paging.

11. The apparatus of claim 10, wherein the second message is a radio resource control (RRC) message or a non-access stratum (NAS) message.

12. The apparatus of claim 10, wherein the third message is a core network paging message, and the core network paging message indicates the access network device to perform the second paging on the terminal device.

13. The apparatus of claim 10, wherein the third message is a session indication message indicating the access network device to suspend, stop, activate, or release a session of the first service.

14. The apparatus according to claim 10, wherein the third paging identifier is a multicast and broadcast service (MBS) session identifier, a temporary mobile group identity (TMGI), or an internet protocol (IP) multicast address.

15. The apparatus of claim 10, wherein the one or more processors is further configured to:
send a fourth message to the terminal device, wherein the fourth message comprises the second paging identifier, and the fourth message is used to perform the second paging on the terminal device.

16. An apparatus, comprising:
a non-transitory memory configured to store program instructions; and
one or more processors configured to execute the program instructions to cause the apparatus to:
receive a first message sent by an access network device, wherein the first message is used to perform first paging on the target terminal device and comprises a first paging identifier used to identify a first service, and the first paging identifier is a multicast and broadcast service (MBS) session identifier, a temporary mobile group identity (TMGI), or an internet protocol (IP) multicast address; and
receive a second message sent by the access network device, wherein the second message comprises a second paging identifier, the second paging identifier is used to replace, during second paging, the first paging identifier to identify the first service, and the second paging is next paging of the first paging.

17. The apparatus of claim 16, wherein the second message is a radio resource control (RRC) message or a non-access stratum (NAS) message.

18. The apparatus of claim 16, wherein the one or more processors is further configured to:
receive a fourth message sent by the access network device, wherein the fourth message comprises the second paging identifier, and the fourth message is used to perform the second paging on the terminal device.

* * * * *